United States Patent
Chae

(10) Patent No.: US 11,557,108 B2
(45) Date of Patent: Jan. 17, 2023

(54) POLYGON DETECTION DEVICE, POLYGON DETECTION METHOD, AND POLYGON DETECTION PROGRAM

(71) Applicant: Rakuten Group, Inc., Tokyo (JP)

(72) Inventor: Yeongnam Chae, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 0 days.

(21) Appl. No.: 16/649,776

(22) PCT Filed: Apr. 10, 2019

(86) PCT No.: PCT/JP2019/015617
§ 371 (c)(1),
(2) Date: Mar. 23, 2020

(87) PCT Pub. No.: WO2020/208742
PCT Pub. Date: Oct. 15, 2020

(65) Prior Publication Data
US 2021/0142098 A1    May 13, 2021

(51) Int. Cl.
*G06K 9/62* (2022.01)
*G06V 10/44* (2022.01)
(Continued)

(52) U.S. Cl.
CPC .............. *G06V 10/443* (2022.01); *G06T 7/60* (2013.01); *G06V 10/457* (2022.01);
(Continued)

(58) Field of Classification Search
None
See application file for complete search history.

(56) References Cited

U.S. PATENT DOCUMENTS 8,125,544 B2 * 2/2012 Yoshii .................. G06K 9/3216
348/252
8,805,077 B2 * 8/2014 Guo ..................... G06K 9/3233
382/176
(Continued)

FOREIGN PATENT DOCUMENTS

JP        62-282388 A    12/1987
JP        2008-117228 A   5/2008
(Continued)

OTHER PUBLICATIONS

Vasiliev, "Recognition of 2-D object on geometrical quasisimilarity of polygonal representations." In SMC'98 Conference Proceedings. 1998 IEEE International Conference on Systems, Man, and Cybernetics (Cat. No. 98CH36218), vol. 5, pp. 4396-4400. IEEE, 1998. (Year: 1998).*

(Continued)

*Primary Examiner* — Feng Niu
(74) *Attorney, Agent, or Firm* — Sughrue Mion, PLLC

(57) ABSTRACT

An object is to provide a polygon detection device, a polygon detection method, and a polygon detection program to accurately detect a polygon resembling a reference polygon from an image.
The polygon detection device acquires a ratio among lengths of sides of a reference polygon included in an appearance of a predetermined object. The polygon detection device acquires a photographic image of the predetermined object. The polygon detection device detects line segments from the acquired photographic image. The polygon detection device forms at least one polygon based on the detected line segments. The polygon detection device identifies, from the formed polygon, a polygon corresponding to the reference polygon based on a degree of similarity between a ratio among lengths of sides of the formed polygon and the
(Continued)

acquired ratio among the lengths of sides of the reference polygon, among from the formed polygon.

19 Claims, 17 Drawing Sheets

(51) Int. Cl.
| | |
|---|---|
| *G06V 30/18* | (2022.01) |
| *G06V 30/184* | (2022.01) |
| *G06V 30/19* | (2022.01) |
| *G06V 30/414* | (2022.01) |
| *G06T 7/60* | (2017.01) |
| *G06V 30/10* | (2022.01) |

(52) U.S. Cl.
CPC ...... *G06V 30/184* (2022.01); *G06V 30/18019* (2022.01); *G06V 30/18076* (2022.01); *G06V 30/19027* (2022.01); *G06V 30/414* (2022.01); *G06V 30/10* (2022.01)

(56) References Cited

U.S. PATENT DOCUMENTS

| | | | | |
|---|---|---|---|---|
| 2010/0053410 | A1* | 3/2010 | Yoshii | H04N 9/04 348/333.11 |
| 2012/0257833 | A1* | 10/2012 | Guo | H04N 5/142 382/199 |
| 2015/0042791 | A1* | 2/2015 | Metois | G06K 9/6202 348/135 |
| 2017/0263016 | A1* | 9/2017 | Nodera | G06T 7/62 |
| 2018/0082456 | A1* | 3/2018 | Liu | G06K 9/6267 |
| 2018/0336685 | A1* | 11/2018 | Miyauchi | G06T 7/174 |

FOREIGN PATENT DOCUMENTS

| | | |
|---|---|---|
| JP | 2010-062722 A | 3/2010 |
| JP | 2012-114665 A | 6/2012 |
| JP | 2012-221118 A | 11/2012 |
| JP | 2017-162218 A | 9/2017 |

OTHER PUBLICATIONS

Yuyama et al., "Shape invariant recognition of polygonal road signs by deforming reference templates." In 2008 2nd International Conference on Signal Processing and Communication Systems, pp. 1-6. IEEE, 2008. (Year: 2008).*
Deng et al., "Real-Time Detection of Polygons and Circles Based on Semantics." In 2018 IEEE International Conference on Information and Automation (ICIA), pp. 444-449. IEEE, 2018. (Year: 2018).*
Qin et al., "Polygon detection and localization based on link-line model." In Proceeding of the 11th World Congress on Intelligent Control and Automation, pp. 1874-1880. IEEE, 2014. (Year: 2014).*
Gidney et al., "Real-time pose determination of polygons in a 2-D image." In Proceedings 1995 Canadian Conference on Electrical and Computer Engineering, vol. 2, pp. 913-915. IEEE, 1995. (Year: 1995).*
Van et al., "Vehicle Classification in Video Based on Shape Analysis." In 2014 European Modelling Symposium, pp. 151-157. IEEE, 2014. (Year: 2014).*
International Search Report for PCT/JP2019/015617 dated Jul. 9, 2019 [PCT/ISA/210].

* cited by examiner

FIG.3
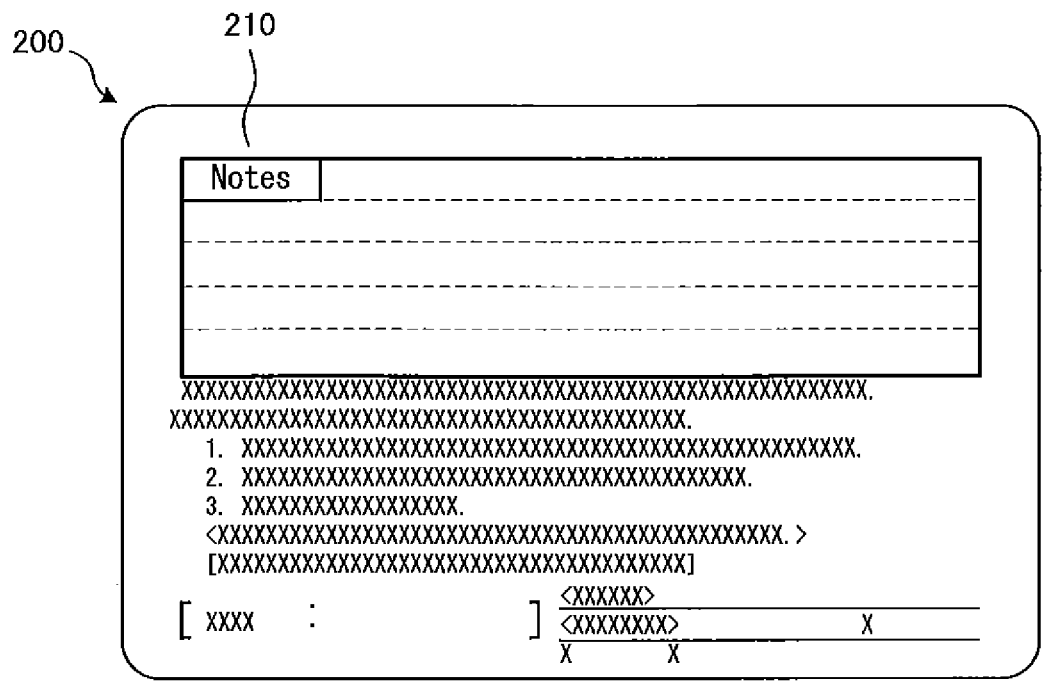
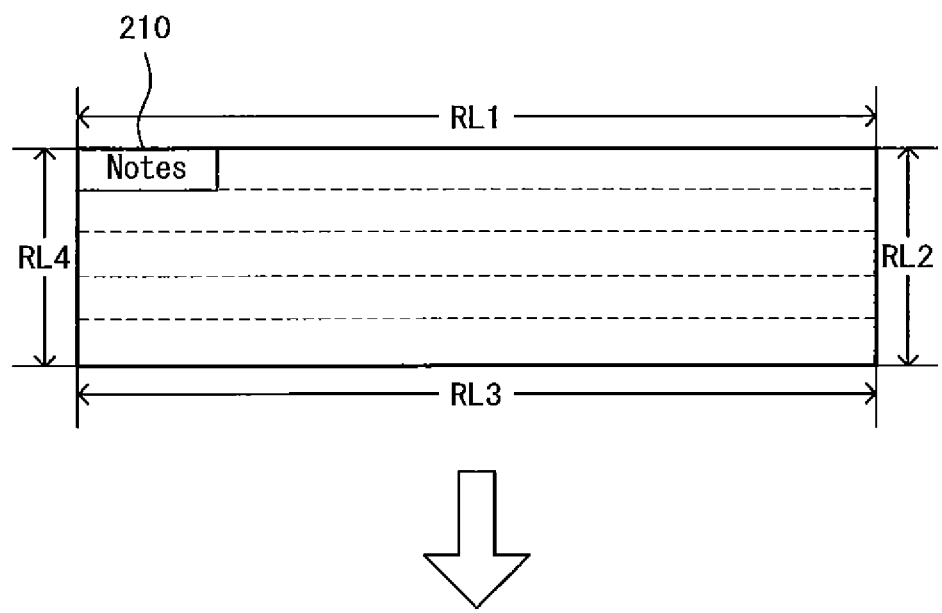
RL1 : RL2 : RL3 : RL4

FIG.6
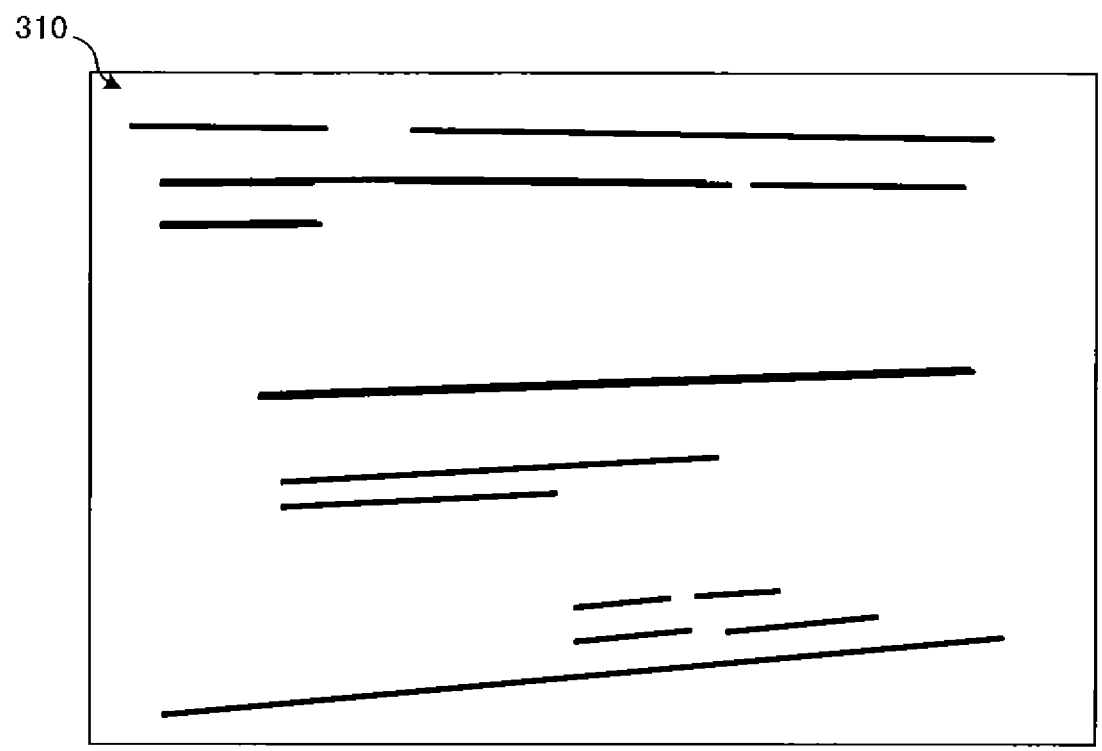
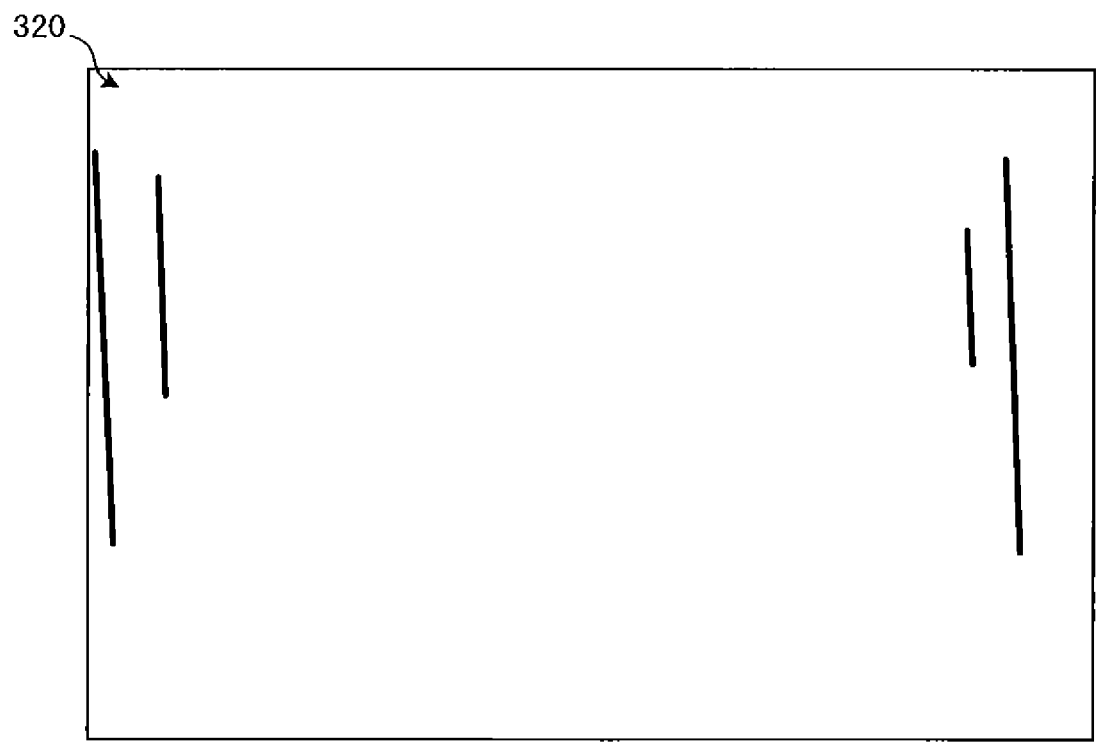

FIG.11
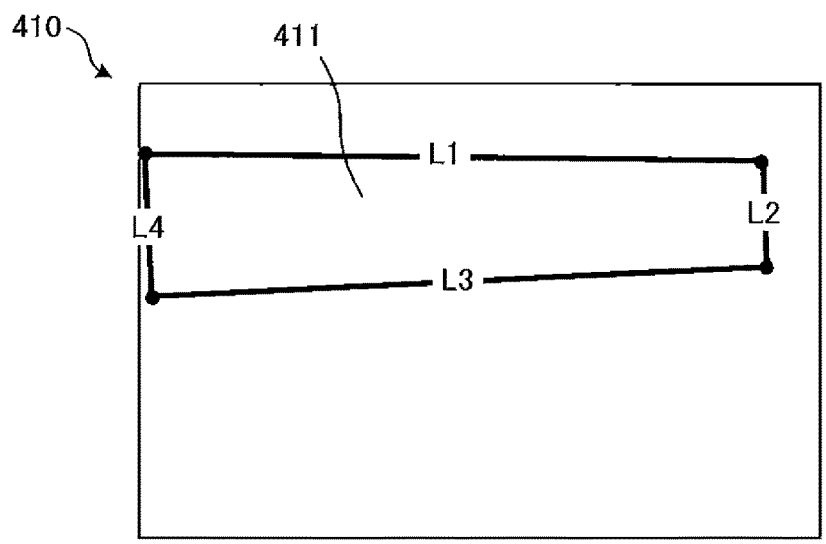
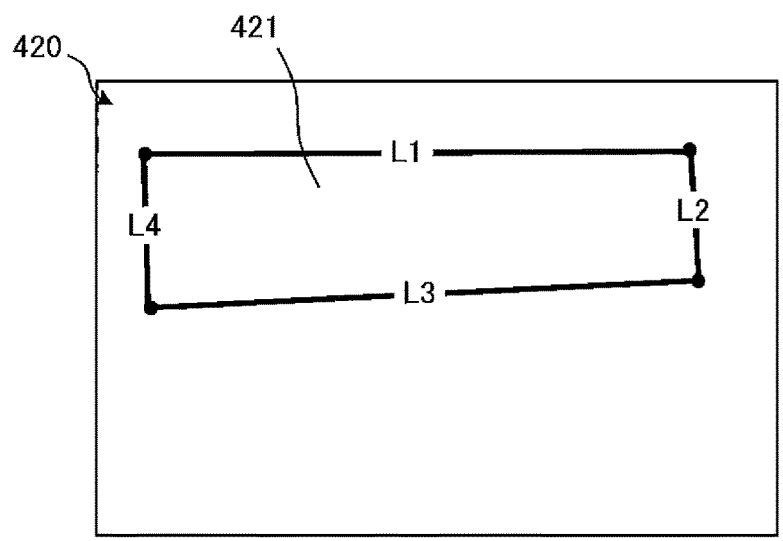
CALCULATE SIMILARITY SCORE BETWEEN RL1:RL2:RL3:RL4 AND L1:L2:L3:L4

FIG.12
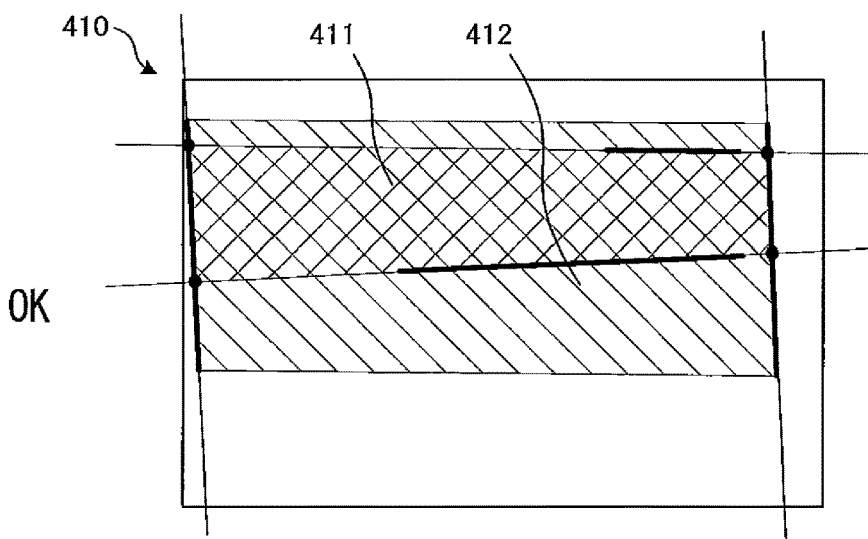
OK
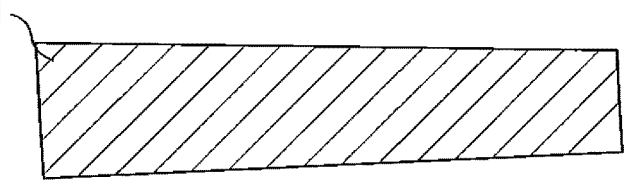
SUPPOSED POLYGON ∩ ALL-LINE-SEGMENT-INCLUDING POLYGON
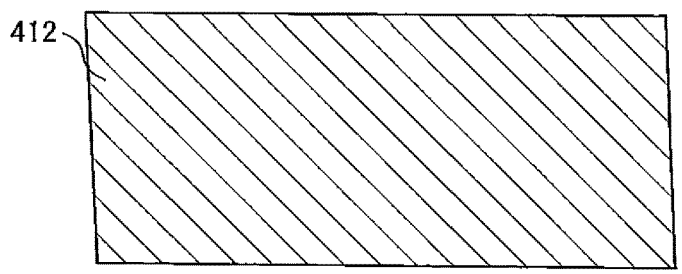
SUPPOSED POLYGON ∪ ALL-LINE-SEGMENT-INCLUDING POLYGON
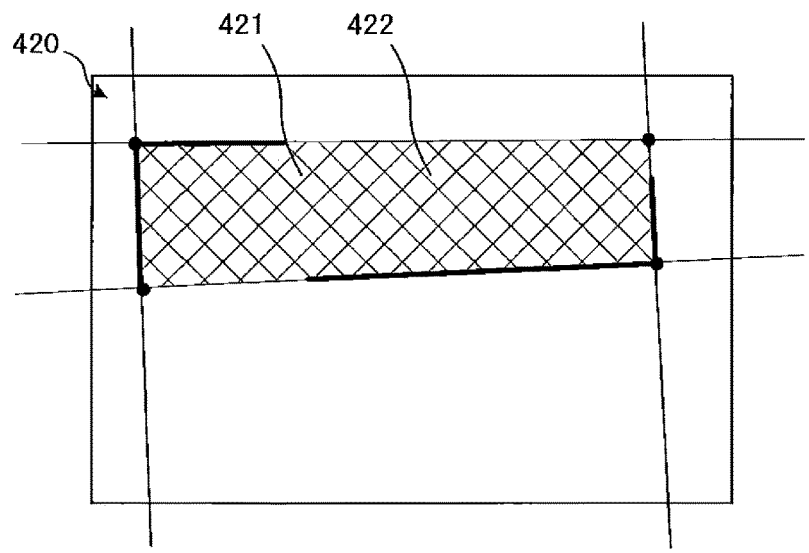

FIG.13
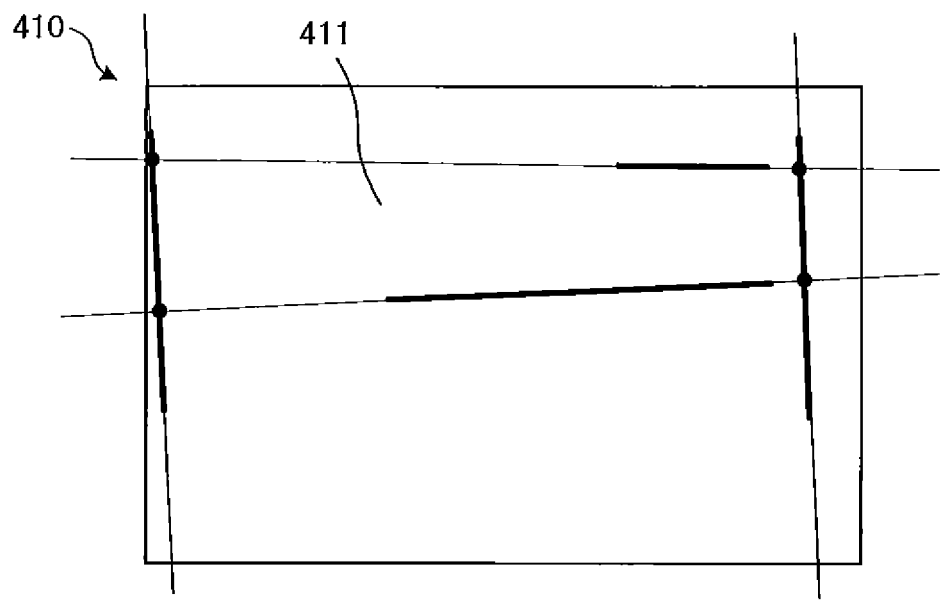
SIDES ∩ DETECTED LINE SEGMENTS
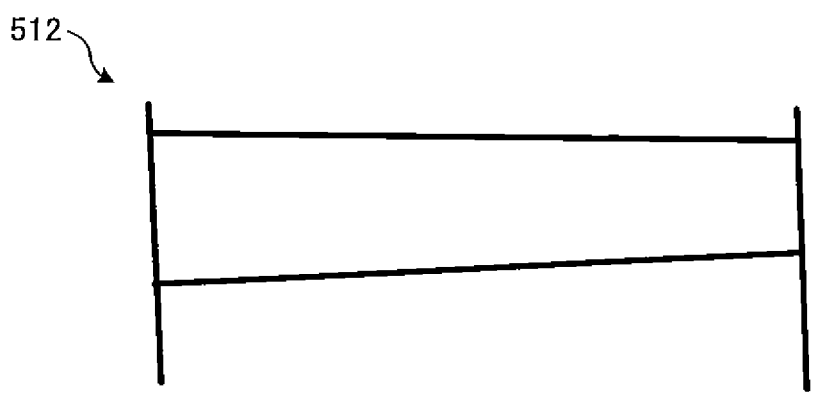
SIDES ∪ DETECTED LINE SEGMENTS

FIG.14
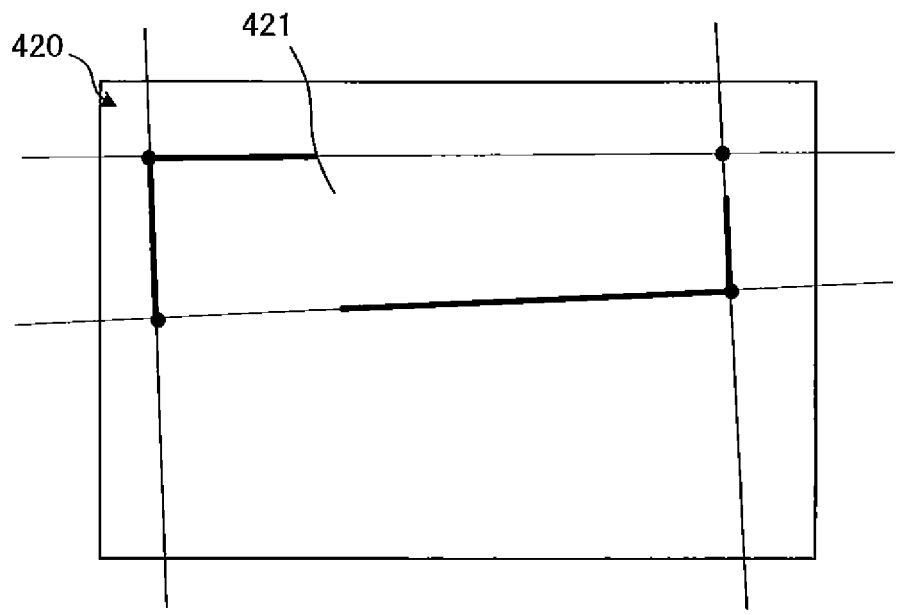
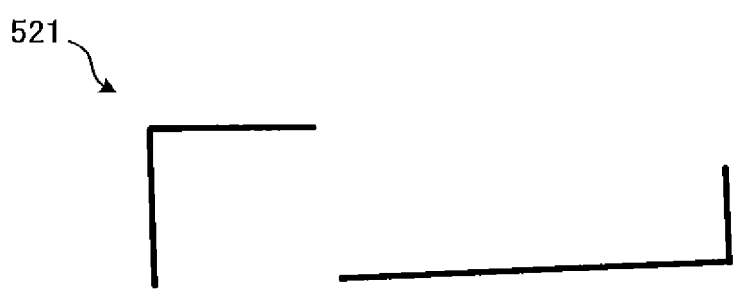
SIDES ∩ DETECTED LINE SEGMENTS
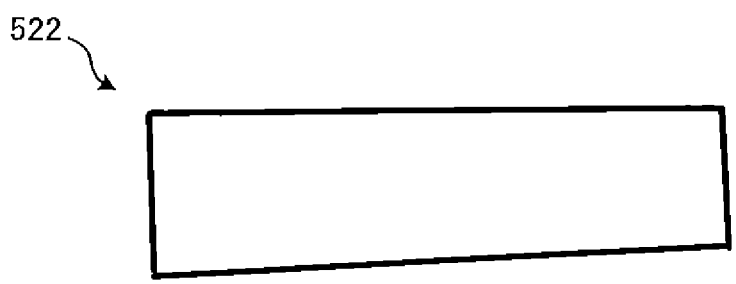
SIDES ∪ DETECTED LINE SEGMENTS

POLYGON DETECTION DEVICE, POLYGON DETECTION METHOD, AND POLYGON DETECTION PROGRAM

CROSS REFERENCE TO RELATED APPLICATIONS

This application is a National Stage of International Application No. PCT/JP2019/015617 filed Apr. 10, 2019.

TECHNICAL FIELD

The present invention relates to a method of detecting a predetermined polygon from a photographic image.

BACKGROUND ART

Conventionally, a technology of detecting a figure such as a polygon from an image has been known. For example, Patent Literature 1 discloses a method of detecting a rectangle included in an image. Specifically, in this method, an image is projected onto a plurality of projection axes, feature points are detected from these projected images, and candidates for rectangular vertices are extracted from the feature points.

CITATION LIST

Patent Literature

Patent Literature 1: JP 1987-282388 A

SUMMARY OF INVENTION

Technical Problem

Incidentally, there is a case where it is desired to identify a predetermined object or a predetermined portion of the object from an image acquired by photographing the predetermined object. In this case, it is conceivable that a polygon resembling a reference polygon that is a shape of the object or the portion is detected first from the image. However, in a conventional method of extracting feature points from an image, combinations of polygon vertex candidates become enormous in a case where similar feature points exist in the image. Thus, there is a case where it is difficult to detect a polygon resembling the reference polygon.

The present invention is provided in view of the above points and an example of an object thereof is to provide a polygon detection device, a polygon detection method, and a polygon detection program with which a polygon resembling a reference polygon is accurately detected from an image.

Solution to Problem

An aspect of the present invention is a polygon detection device comprising: a ratio acquiring means that acquires a ratio among lengths of sides of a reference polygon included in an appearance of a predetermined object; an image acquiring means that acquires a photographic image of the predetermined object; a detection means that detects line segments from the acquired photographic image; a forming means that forms at least one polygon based on the detected line segments; and an identifying means that identifies, from the formed polygon, a polygon corresponding to the reference polygon based on a degree of similarity between a ratio among lengths of sides of the formed polygon and the acquired ratio among lengths of sides of the reference polygon.

According to this aspect, a polygon corresponding to a reference polygon is identified based on a degree of similarity between a ratio among lengths of sides of a polygon formed based on line segments detected from a photographic image and a ratio of among lengths of sides the reference polygon. Among formed polygons, a polygon resembling the reference polygon has a relatively high degree of similarity in a ratio among lengths of sides with respect to the reference polygon. Thus, a polygon resembling the reference polygon can be accurately detected from the image.

Another aspect of the present invention is the polygon detection device, wherein the forming means identifies line segments used to form the polygon from relatively long line segments among the detected line segments.

According to this aspect, in a case where a region to be identified is equal to larger than a certain degree in a photographic image, it is possible to form a polygon by using line segments having a high probability that it is included in a polygon corresponding to a reference polygon.

Yet another aspect of the present invention is the polygon detection device, wherein the detection means separates at least some line segments among the detected line segments into a plurality of groups determined based on a relationship among sides included in the reference polygon, and the forming means identifies a line segment used to form the polygon from each of the plurality of groups.

According to this aspect, a polygon is formed by use of a line segment included in each of a plurality of groups determined based on a relationship between sides included in a reference polygon. Thus, a polygon can be formed by use of line segments corresponding to sides included in the reference polygon. Also, since the number of combinations of line segments used to form a polygon can be reduced, a speed of detecting a corresponding polygon can be improved.

Yet another aspect of the present invention is the polygon detection device, wherein the detection means separates at least some line segments among the detected line segments into a plurality of groups based on angles of the line segments, and the forming means identifies a line segment used to form the polygon from each of the plurality of groups.

According to this aspect, a plurality of groups can be determined based on an angle between sides included in a reference polygon. Thus, a polygon can be formed by use of line segments corresponding to sides included in the reference polygon.

Yet another aspect of the present invention is the polygon detection device, wherein the reference polygon and the formed polygon are quadrangles, and the detection means separates the at least some line segments into a group of line segments with angles to a predetermined line segment, among the at least some line segments, being larger than a predetermined value, and a group of line segments with angles to the predetermined line segment being equal to or smaller than the predetermined value.

According to this aspect, each of two groups includes line segments having a relatively close angles compared to line segments of the other group. A quadrangle has two pairs of opposite sides, and angles of the opposite sides in each pair are relatively close compared to angles of the opposite sides in the other pair. Thus, an appropriate quadrangle can be formed.

Yet another aspect of the present invention is the polygon detection device, wherein the identifying means identifies the corresponding polygon from a polygon, among the formed polygon, whose components satisfy a predetermined condition.

Yet another aspect of the present invention is the polygon detection device, wherein the predetermined condition is that all vertices of the polygon are located in the photographic image.

According to this aspect, a polygon corresponding to a reference polygon is identified from a polygon in which the entire region surrounded by sides of the polygon is included in a photographic image. In a case where a predetermined object is photographed in such a manner that the entire region surrounded by sides of the reference polygon in a predetermined object is included in a photographing range, accuracy of detecting a polygon corresponding to the reference polygon can be improved.

Yet another aspect of the present invention is the polygon detection device, wherein the predetermined condition is that at least a part of each side included in the polygon overlaps with at least a part of any line segment among line segments used to form the polygon.

According to this aspect, a polygon corresponding to a reference polygon is identified from a polygon in which each line segment used to form the polygon is used to form a at least a part of any side of the polygon. Thus, a polygon having a high probability that it corresponds to a polygon existing in an appearance of a predetermined object can be identified as a polygon corresponding to the reference polygon.

Yet another aspect of the present invention is the polygon detection device, wherein the identifying means gives a weight to a value indicating a degree of similarity between the acquired ratio among lengths of sides of the reference polygon and the ratio among lengths of sides of the formed polygon, and identifies the corresponding polygon based on the weighted value.

According to this aspect, by weighting on a degree of similarity in a ratio among lengths of sides, accuracy of detecting a polygon corresponding to a reference polygon can be improved even when a ratio among lengths of sides of the polygon corresponding to the reference polygon vary according to a photographing angle with respect to a predetermined object.

Yet another aspect of the present invention is the polygon detection device, wherein the forming means forms the polygon having, as vertices, points at which straight lines including line segments used to form the polygon intersect with each other, and the identifying means gives a weight to the value based on a degree of overlap between the formed polygon and a polygon including all line segments used to form the polygon.

According to this aspect, a value indicating a degree of similarity is weighted based on a degree of overlap between a formed polygon and a polygon including all line segments used for the forming. As this degree of overlap becomes higher, probability that the formed polygon exists in an appearance of a predetermined object becomes higher. Thus, it is possible to increase a weight of a polygon having a high probability that it exists.

Yet another aspect of the present invention is the polygon detection device, wherein the forming means forms the polygon having, as vertices, points at which straight lines including line segments used to form the polygon intersect with each other, and the identifying means gives a weight to the value based on a degree of overlap between sides of the formed polygon and line segments used to form the polygon.

According to this aspect, a value indicating a degree of similarity is weighted based on a degree of overlap between sides of a formed polygon and line segments used to form the polygon. As the degree of overlap becomes higher, probability that sides included in the formed polygon exist in an appearance of a predetermined object becomes higher. Thus, it is possible to increase a weight on a polygon that includes sides that are likely to exist.

Yet another aspect of the present invention is the polygon detection device, further comprising a processing means that executes predetermined processing on an image in a region surrounded by sides of the identified polygon in the photographic image.

According to this aspect, it is possible to perform processing on an image in a region to be identified in a predetermined object .

Yet another aspect of the present invention is the polygon detection device, wherein the processing means transforms the image in the region surrounded by the sides of the identified polygon in such a manner that a shape of the region becomes similar to the reference polygon.

According to this aspect, a shape of an image in a region to be identified in a predetermined object can be returned to an original shape of the region.

Yet another aspect of the present invention is the polygon detection device, wherein the processing means recognizes a predetermined kind of information from the image in the region surrounded by the sides of the identified polygon.

According to this aspect, it is possible to recognize information in a region to be identified in a predetermined object from a photographic image.

Yet another aspect of the present invention is the polygon detection device, wherein the predetermined kind of information is a character.

According to this aspect, it is possible to recognize a character in a region to be identified in a predetermined object from a photographic image.

Yet another aspect of the present invention is a polygon detection method performed by a computer, the method comprising: a ratio acquiring step of acquiring a ratio among lengths of sides of a reference polygon included in an appearance of a predetermined object; an image acquiring step of acquiring a photographic image of the predetermined object; a detection step of detecting line segments from the acquired photographic image; a forming step of forming at least one polygon based on the detected line segments; and an identifying step of identifying, from the formed polygon, a polygon corresponding to the reference polygon from based on a degree of similarity between a ratio among lengths of sides of the formed polygon and the acquired ratio among lengths of sides of the reference polygon.

Yet another aspect of the present invention is the polygon detection method, wherein the photographic image is loaded into a memory, in the image acquiring step, and the line segments are detected from the photographic image loaded into the memory, in the detection step.

Yet another aspect of the present invention is a polygon detection program for causing a computer to function as: a ratio acquiring means that acquires a ratio among lengths of sides of a reference polygon included in an appearance of a predetermined object; an image acquiring means that acquires a photographic image of the predetermined object; a detection means that detects line segments from the acquired photographic image; a forming means that forms at least one polygon based on the detected line segments; and an identifying means that identifies, from the formed polygon, a polygon corresponding to the reference polygon from based on a degree of similarity between a ratio among lengths of sides of the formed polygon and the acquired ratio among lengths of sides of the reference polygon.

Advantageous Effects of Invention

According to the present invention, a polygon resembling the reference polygon can be accurately detected from the image.

BRIEF DESCRIPTION OF DRAWINGS

FIG. 3 is a view illustrating an example of a back side and a remarks column 210 of a driver's license 200.

FIG. 6 is a view illustrating an example of grouping of the line segments.

FIG. 11 is a view illustrating examples in specification of a ratio among lengths of sides of the supposed polygon.

FIG. 12 is a view illustrating an example of a degree of overlap between the supposed polygon and an all-line-segment-including polygon.

FIG. 13 is a view illustrating an example of a degree of overlap between sides and line segments.

FIG. 14 is a view illustrating an example of a degree of overlap between sides and line segments.

DESCRIPTION OF EMBODIMENTS

In the following, an embodiment of the present invention will be described in detail with reference to the drawings. The embodiment described in the following is an embodiment of a case where the present invention is applied to a polygon detection device that detects a polygon having a shape resembling or corresponding to a reference polygon included in an appearance of a predetermined object from a photographic image in which a predetermined object is included.

The predetermined object is an object or the like that can be visually recognized. A kind of the predetermined object is not specifically limited. Examples of the predetermined object include various cards, paper, electrical appliances such as a monitor, a terminal device such as a mobile phone, and the like.

For example, the reference polygon included in the appearance of the predetermined object is a shape, which can be visually recognized from the predetermined object, and is an original shape of a region to be identified from the photographic image in the predetermined object. An effect for a convex polygon is higher. A kind of the region to be identified is not specifically limited. Also, the number of sides included in the reference polygon is not specifically limited. For example, the reference polygon may be a shape of the predetermined object itself, may be a shape of one of surfaces of the predetermined object, or may be a shape of a part of region of one of surfaces of the predetermined object. An outer frame of the part of the region has been printed, engraved, drawn or described on the surface, for example.

A polygon that has a shape resembling the reference polygon or that corresponds thereto is called a corresponding polygon. The corresponding polygon is a shape of an image in a region to be identified from a photographic image, and was originally a reference polygon. A photographic image acquired by photographing of a predetermined object includes a reference polygon as a corresponding polygon. Depending on a photographing angle with respect to the predetermined object, there is a case where the corresponding polygon in the photographic image is different from a shape of the original reference polygon in some degree. Thus, the corresponding polygon may or may not be similar to the reference polygon.

In the present embodiment, a case where an outer frame of a specific region on a card-type identification card is a reference polygon will be mainly described.

[1. Configuration of Polygon Detection Device]

Figure 1:
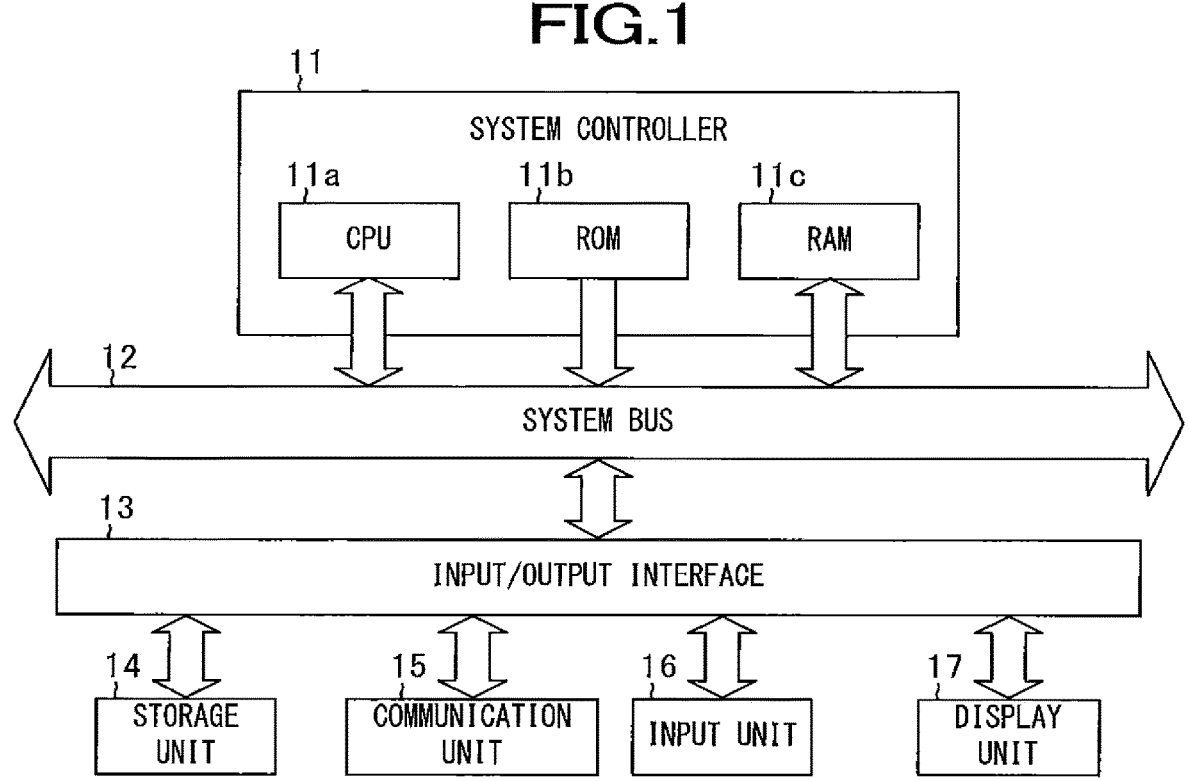
FIG. 1 is a block diagram illustrating an example of a schematic configuration of a polygon detection device 1 according to one embodiment.

First, a configuration of the polygon detection device 1 will be described with reference to FIG. 1. FIG. 1 is a block diagram illustrating an example of a schematic configuration of the polygon detection device 1 according to the present embodiment. As illustrated in FIG. 1, the polygon detection device 1 includes a system controller 11, a system bus 12, an input/output interface 13, a storage unit 14, a communication unit 15, an input unit 16, and a display unit 17. The system controller 11 and the input/output interface 13 are connected through the system bus 12. The polygon detection device 1 may be, for example, a server device or a personal computer.

The system controller 11 includes a central processing unit (CPU) 11a, a read only memory (ROM) 11B, a random access memory (RAM) 11c, and the like.

The input/output interface 13 performs interface processing between the storage unit 14 to the display unit 17 and the system controller 11.

The storage unit 14 includes, for example, a hard disk drive, a solid-state drive, or the like. For example, the storage unit 14 stores information related to a predetermined object and a reference polygon. An example of this information is an image of the predetermined object. This image is an image (such as image acquired through scanner) from which a shape of a region to be identified can be accurately understood as a reference polygon. Also, examples of the stored information include a ratio among lengths of sides, or the like, included in a reference polygon. The storage unit 14 further stores an operating system, a program for polygon detection, and the like. For example, various programs may be acquired from a predetermined computer through a network, or may be recorded in a recording medium such as an optical disk, a memory card, or a magnetic tape and read through a drive device.

The communication unit 15, for example, includes a network interface controller or the like. The communication unit 15 is connected to other computers through a predetermined network such as the Internet or a local area network (LAN) and controls a state of communication with the computers.

The input unit 16 receives operation by an operator and outputs a signal corresponding to operation contents to the system controller 11. Examples of the input unit 16 include a keyboard, a mouse, a touch panel, and the like.

The display unit 17, for example, includes a graphic controller, a display, and the like. The display unit 17 displays information such as an image or a character under control of the system controller 11. Examples of a panel of the display include a liquid crystal panel, an organic light emitting panel, and the like.

[2. Functional Outline of System Controller of Polygon Detection Device]

Figure 2:
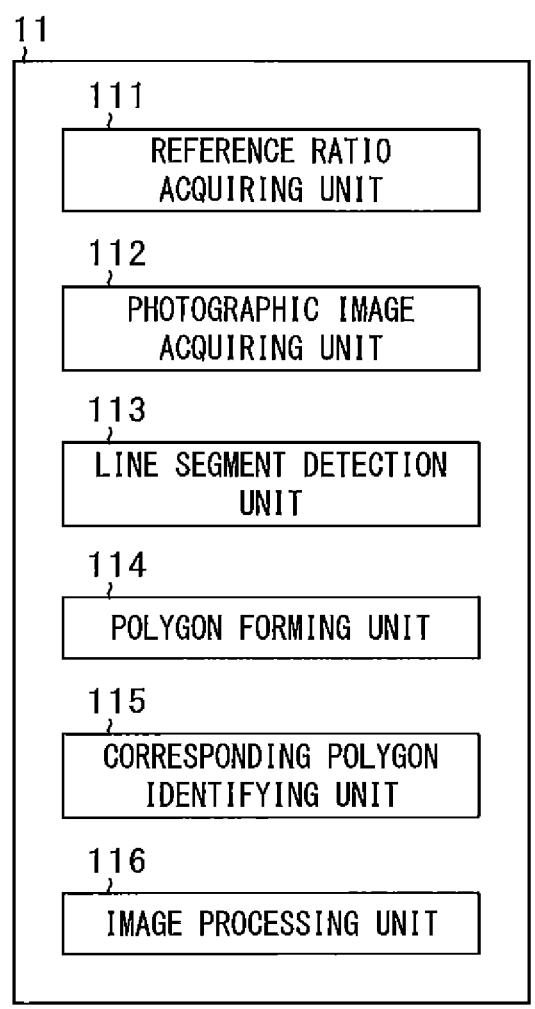
FIG. 2 is a view illustrating an example of functional blocks of a system controller 11 of the polygon detection device 1 according to the one embodiment.

Next, a functional outline of the system controller 11 will be described with reference to FIG. 2 to FIG. 14. FIG. 2 is a view illustrating an example of functional blocks of the system controller 11 of the polygon detection device 1 according to the present embodiment. As illustrated in FIG. 2, when the CPO lla reads and executes various codes or the like included in a program stored in the storage unit 14, the system controller 11 functions as a reference ratio acquiring unit 111, a photographic image acquiring unit 112, a line segment detection unit 113, a polygon forming unit 114, a corresponding polygon identifying unit 115, an image processing unit 116, and the like.

The reference ratio acquiring unit 111 acquires a ratio among lengths of sides of a reference polygon included in an appearance of a predetermined object. For example, the reference ratio acquiring unit 111 may acquire information that is previously stored in the storage unit 14 and that indicates a ratio among lengths of sides. Alternatively, an operator may input a ratio among lengths of sides by using the input unit 16. Alternatively, the reference ratio acquiring unit 111 may acquire the information indicating a ratio among lengths of sides from another computer through the network. Alternatively, the reference ratio acquiring unit 111 may identify various regions from a predetermined object by analyzing an image from which a shape of a region to be identified can be accurately understood as a reference polygon. The reference ratio acquiring unit 111 may determine, as a reference polygon, an outer frame of a region designated by an operator among identified regions. The reference ratio acquiring unit 111 may automatically calculate a ratio among lengths of sides from the determined reference polygon.

FIG. 3 is a view illustrating an example of a back side and a remarks column 210 of a driver's license 200. The driver's license 200 is an example of a predetermined object. A shape of the remarks column 210 is a reference polygon on the back side of the driver's license 200. This reference polygon is a rectangle. With respect to the reference polygon that is the shape of the remarks column 210, the reference ratio acquiring unit 111, for example, acquires a ratio among a length of a long side RL1, a length of a short side RL2, a length of a long side RL3, and a length of a short side RL4.

The photographic image acquiring unit 112 acquires a photographic image of a predetermined object. It is estimated that this photographic image includes a corresponding polygon to be detected. The photographic image acquiring unit 112 may acquire a photographic image from another computer through a network, for example. Alternatively, the polygon detection device 1 may include a digital camera, and the photographic image acquiring unit 112 may acquire a photographic image from this digital camera. Alternatively, the photographic image acquiring unit 112 may acquire a photographic image from a recording medium through a drive device. The photographic image acquiring unit 112 loads the acquired photographic image into a memory such as the RAM lic.

Figure 4:
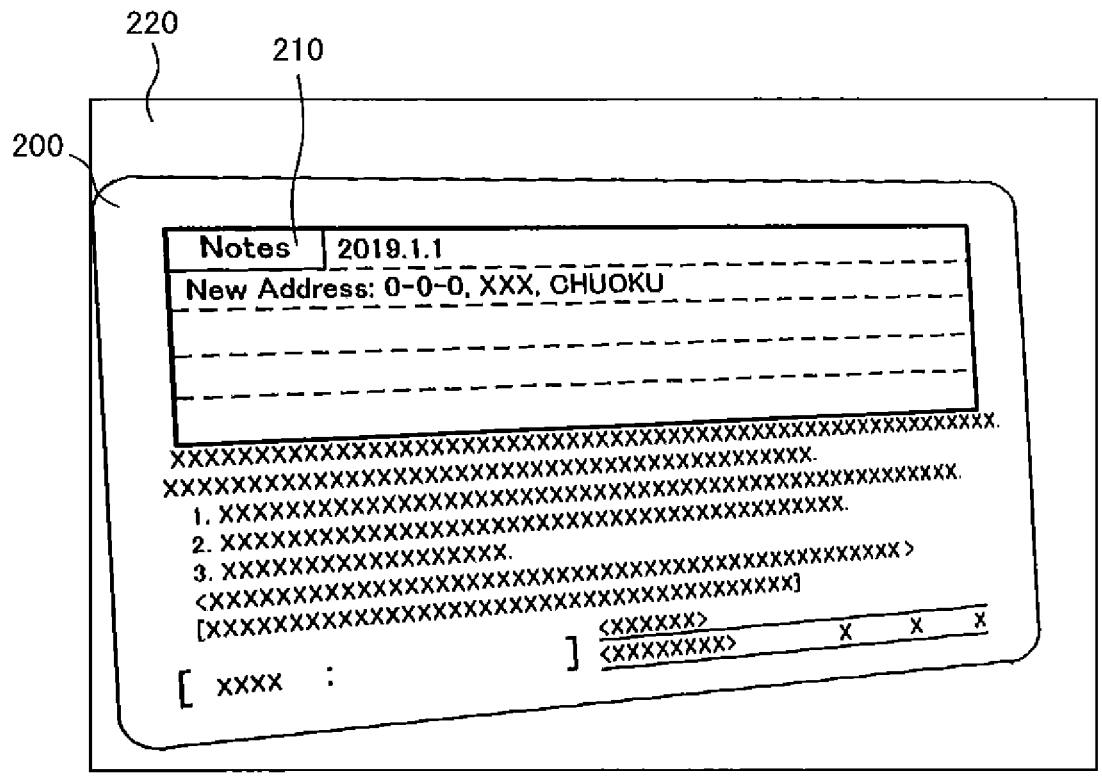
FIG. 4 is a view illustrating an example of a photographic image.

FIG. 4 is a view illustrating an example of a photographic image. The photographic image illustrated in FIG. 4 is an image acquired by photographing a driver's license 200 of a certain user, for example. In this photographic image, the driver's license 200, which is a predetermined object, is inclined in a horizontal direction when seen from a photographing point. Thus, a shape of the remarks column 210 in the photograph is not strictly similar to a shape of the remarks column 210 illustrated in FIG. 3. Also, a new address of the user is written in the remarks column 210.

Figure 5A:
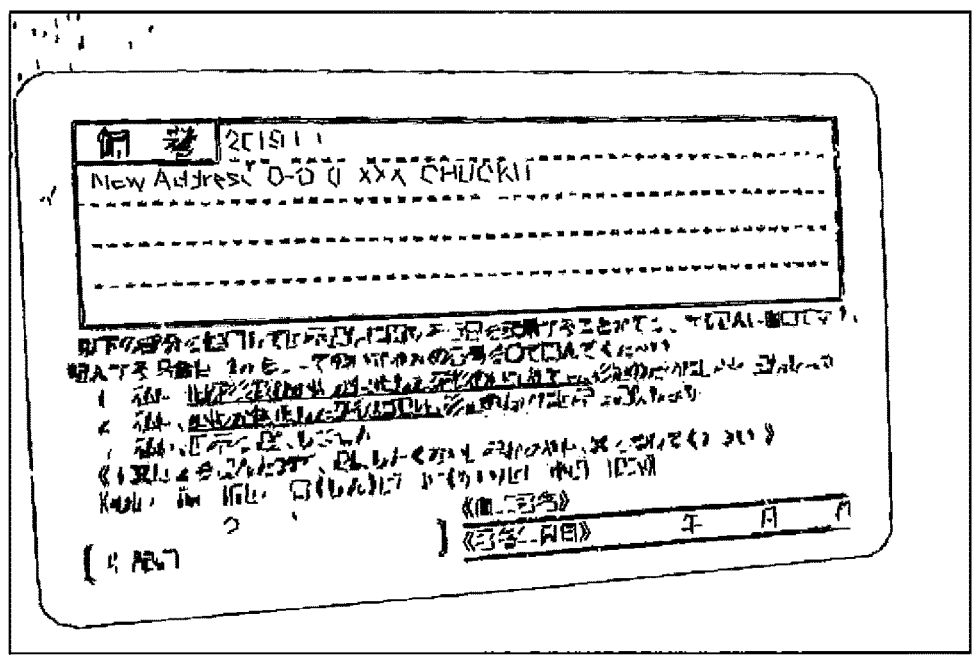
FIG. 5A is a view illustrating an example of line segments detected from the photographic image illustrated in FIG. 4.

The line segment detection unit 113 detects line segments from the photographic image acquired by the photographic image acquiring unit 112. For example, the line segment detection unit 113 may detect line segments by using edge detection. FIG. 5A is a view illustrating an example of line segments detected from the photographic image illustrated in FIG. 4. The predetermined object may be large or is small in a photographic image. Thus, the line segment detection unit 113 detects line segments regardless of thickness. Therefore, there is a case where the photographic image acquiring unit 112 detects a double line with respect to a line segment recognized, from the photographic image, to be thick in human vision. Also, there is a case where the photographic image acquiring unit 112 detects a plurality of line segments with respect to a line segment seen as one segment in human vision. Detection errors in these degrees do not specifically cause a problem.

Figure 5B:
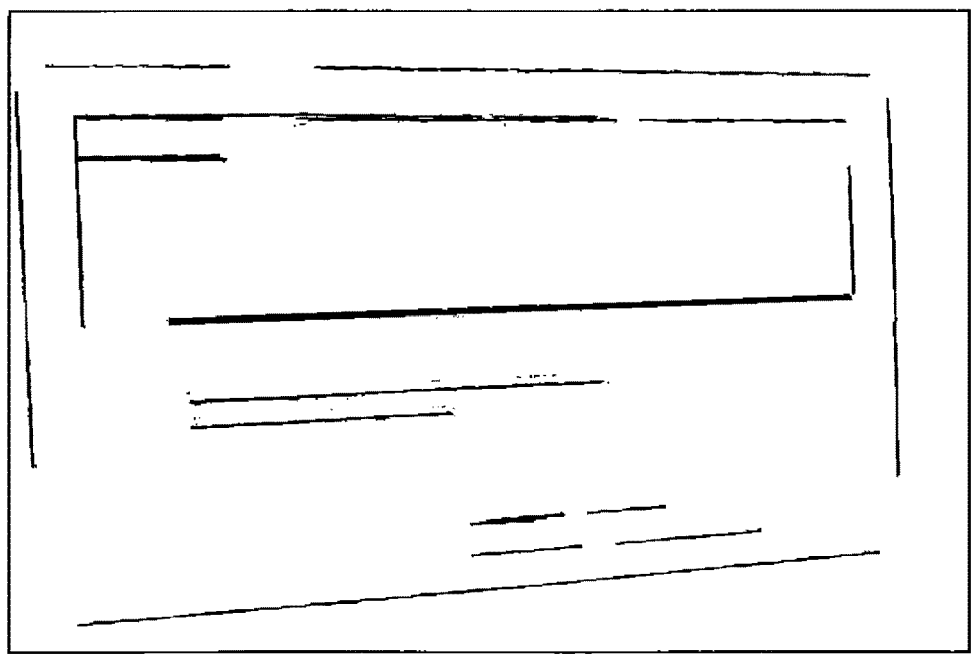
FIG. 5B is a view illustrating an example of relatively long line segments among line segments illustrated in FIG. 5A.

The line segment detection unit 113 may determine, as candidates for line segments used to form polygons, only relatively long line segments among the detected line segments. For example, in a case where a predetermined object is photographed in such a manner that a region to be identified is seen clearly, the region to be identified is equal to or larger than a certain degree in the photographic image. Thus, there is a high probability that an outer frame of the region includes relatively long line segments in the photographic image. Also, lines included in characters and lines included a fine pattern can be excluded from line segments used to form polygons. It is possible to improve accuracy of detecting a corresponding polygon by excluding relatively short line segments. Also, since line segments that are candidates for sources for forming polygons can be reduced, a processing speed can be improved. For example, the line segment detection unit 113 may identify the longest line segment among the detected line segments. Then, the line segment detection unit 113 may exclude, from the line segments used to form the polygons, line segments having lengths shorter than a predetermined proportion to a length of the longest line segment. FIG. 5B is a view illustrating an example of relatively long line segments among the line segments illustrated in FIG. 5A.

The line segment detection unit 113 may separate at least some line segments among the detected line segments into a plurality of groups determined based on a relationship between sides included in the reference polygon. A plurality of groups is determined in such a manner that each side included in the reference polygon is classified into any one of the plurality of groups. The relationship between the sides included in the reference polygon may be, for example, an angle formed between the sides. Thus, the line segment detection unit 113 may separate at least some line segments among the detected line segments into the plurality of groups based on angles of the detected line segments.

For example, in a case where the reference polygon is a quadrangle, the line segment detection unit 113 may separate at least some line segments into a group of line segments with angles to a predetermined line segment being larger than a predetermined value and a group of line segments with angles to the predetermined line segment being equal to or smaller than the predetermined value among these line segments. Accordingly, each of the two groups includes line segments having relatively close angles compared to line segments of the other group. A quadrangle has two pairs of opposite sides, and angles of the opposite sides in each pair are relatively close compared to angles of the opposite sides in the other pair. This tendency is strong in a convex polygon. Specifically, in the case of a rectangle, angles of opposite sides are the same and an angle between sides connected at a vertex is 90degrees. Thus, it is possible to classify a line segment appropriately by using a comparison between an angle and a predetermined value. The predetermined line segment may be, for example, the longest line segment. The predetermined value may be 45degrees, for example. FIG. 6 is a view illustrating an example of grouping of line segments. In FIG. 6, a group 310 is a group of line segments with angles to the longest line segment being smaller than 45 degrees among the line segments illustrated in FIG. 5A. A group 320 is a group of line segments with angles to the longest line segment being equal to or larger than 45 degrees. The at least some line segments are relatively long line segments among the detected line segments as described above, for example.

The polygon forming unit 114 forms at least one polygon based on the line segments detected by the line segment detection unit 113. The formed polygon is called a supposed polygon. For example, the polygon forming unit 114 identifies line segments, the number thereof corresponding to the number of sides of the reference polygon, from the detected line segments and generates a combination including the identified line segments. The number of generated combinations is not specifically limited. The polygon forming unit 114 may generate a predetermined number of combinations by randomly identifying line segments, for example. The polygon forming unit 114 may identify line segments used to form a supposed polygon from relatively long line segments among the line segments detected by the line segment detection unit 113.

Figure 7:
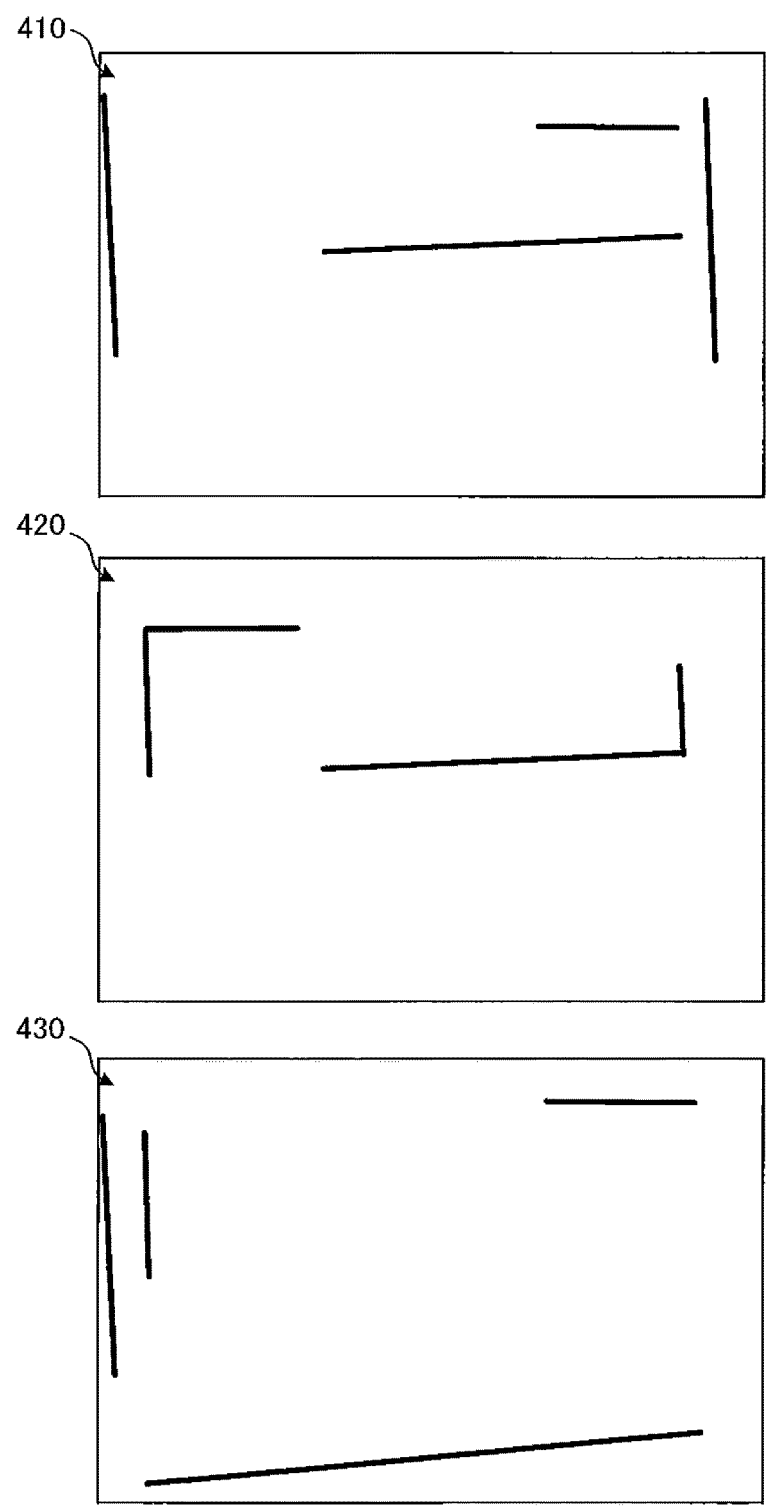
FIG. 7 is a view illustrating an example of combinations of the line segments.

In a case where the line segments are separated into a plurality of groups by the line segment detection unit 113, the polygon forming unit 114 may identify a line segment used to form the supposed polygon from each of the plurality of groups. Thus, it is possible to form the supposed polygon by using line segments corresponding to sides included in the reference polygon. Also, when a line segment is selected from each of the plurality of groups and polygons are formed, the number of combinations of line segments used to form the polygons is reduced. Thus, it is possible to improve a processing speed in forming of the supposed polygons. For example, in a case where the reference polygon is a quadrangle, line segments are separated into two groups as described above. The line segment detection unit 113 identifies two line segments from each group and generates a combination including four line segments. FIG. 7 is a view illustrating an example of combinations of line segments. For example, as illustrated in FIG. 7, combinations of line segments 410, 420, 430, and the like are generated.

Figure 8:
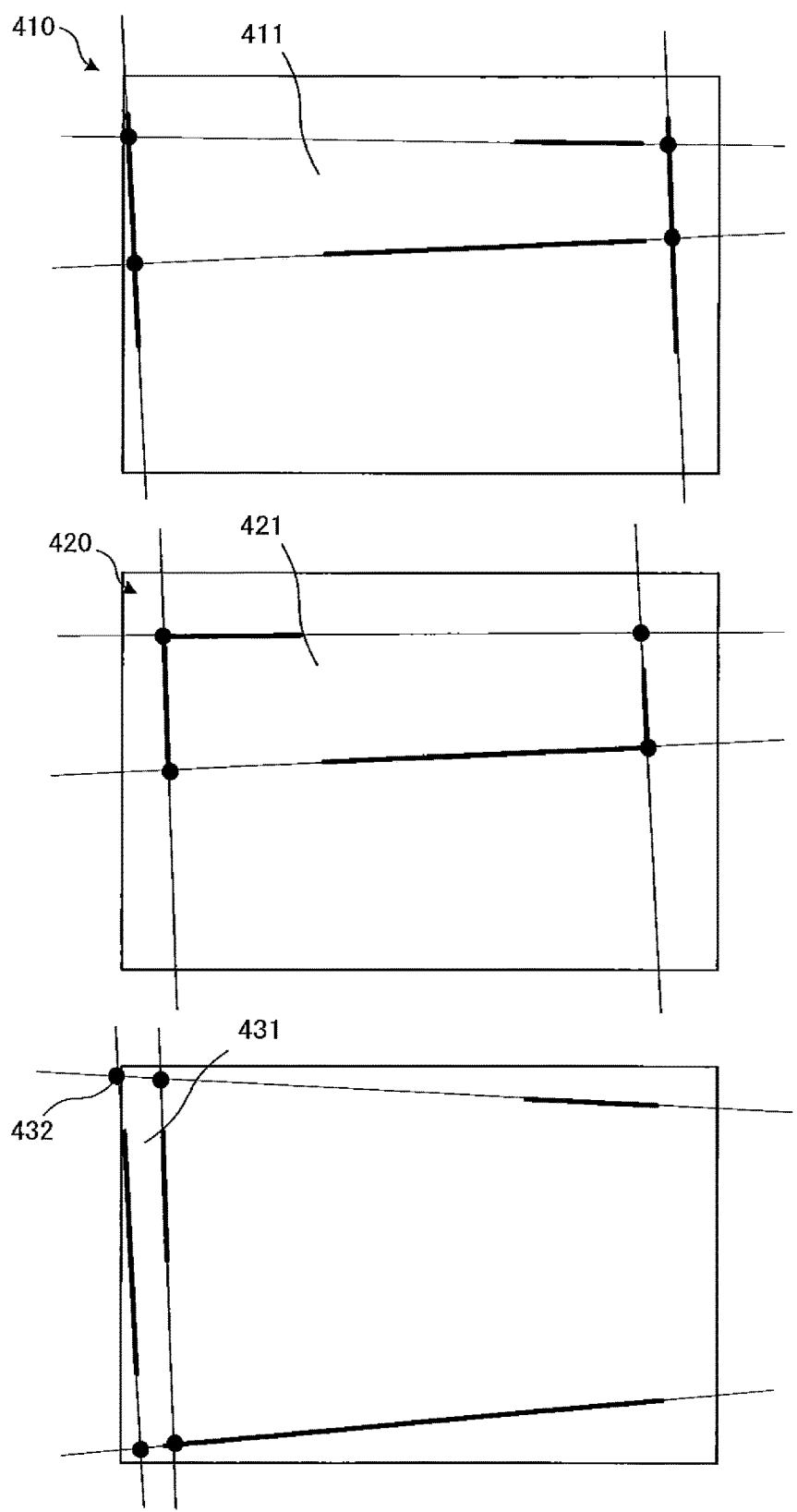
FIG. 8 is a view illustrating an example of formed supposed polygons.

When the combination is generated, the polygon forming unit 114 generates a supposed polygon from the combination. For example, the polygon forming unit 114 calculates a straight line including each line segment included in the combination. The polygon forming unit 114 calculates, as coordinates of a vertex of the supposed polygon, coordinates of an intersection between straight lines including line segments identified from different groups. FIG. 8 is a view illustrating an example of formed supposed polygons. For example, supposed polygons 411, 421, and 431 are respectively formed from the combinations of line segments 410, 420, and 430.

Among the formed supposed polygons, the polygon forming unit 114 may determine, as candidates for a corresponding polygon, only supposed polygons in which components of the supposed polygons satisfy a predetermined condition. The components are, for example, vertices or sides.

For example, the predetermined condition may be that all vertices of a supposed polygon are located in a photographic image.

Figure 9:
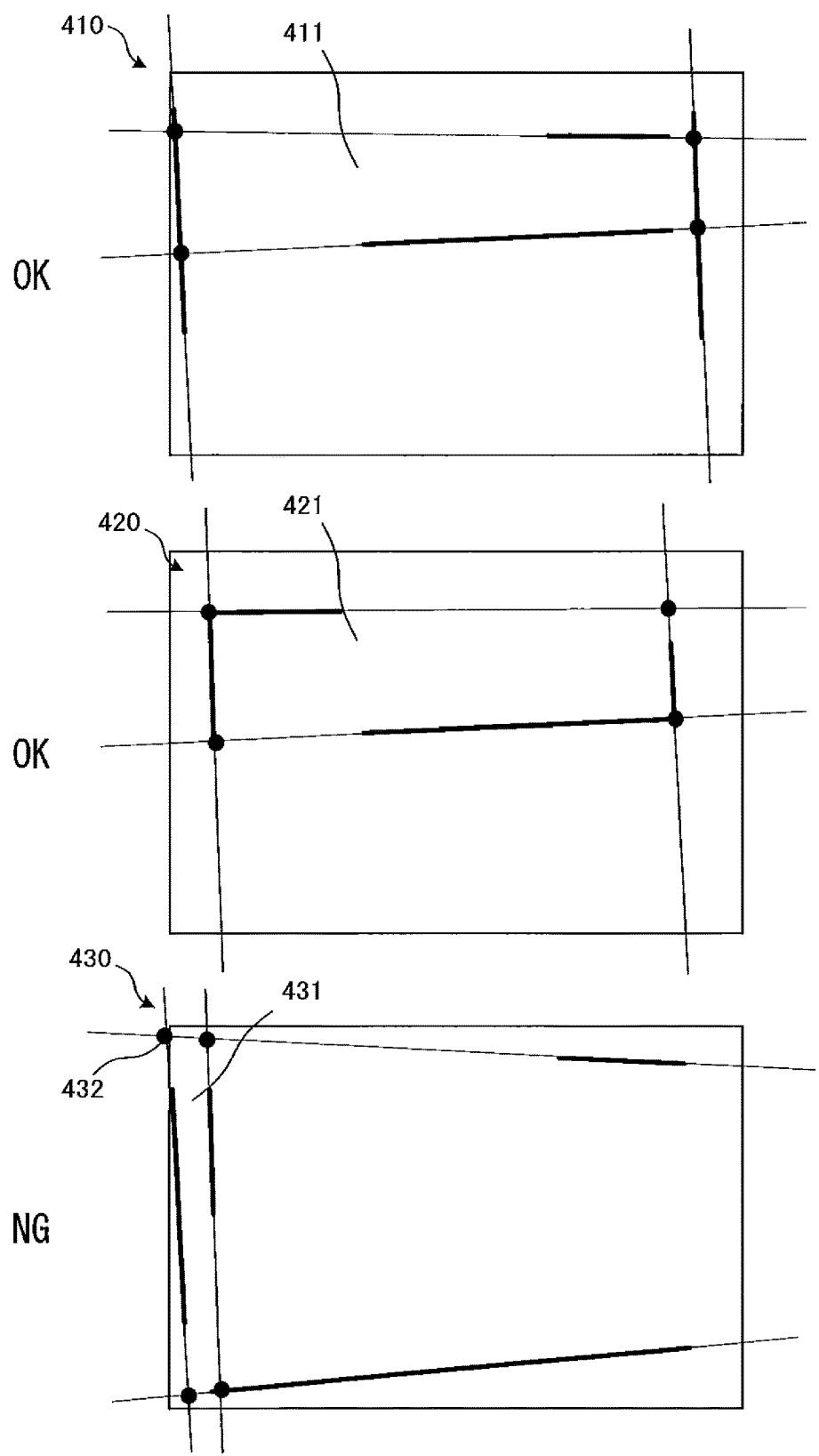
FIG. 9 is a view illustrating an example of determination of vertexes of the supposed polygons.

That is, the condition is that the entire region to be identified is in the photographic image . In a case where a predetermined object is photographed in such a manner that the entire region to be identified is included, a photographic image includes the entire region. Thus, by using this condition, it is possible to exclude polygons that do not have a shape of the region to be identified. FIG. 9 is a view illustrating an example of determination of vertices of supposed polygons. As illustrated in FIG. 9, all vertices of each of the supposed polygons 411 and 421 are located in a photographic image. A vertex 430 of the supposed polygon 431 is located outside the photographic image. Thus, the supposed polygon 431 is excluded from candidates for the corresponding polygon.

Figure 10:
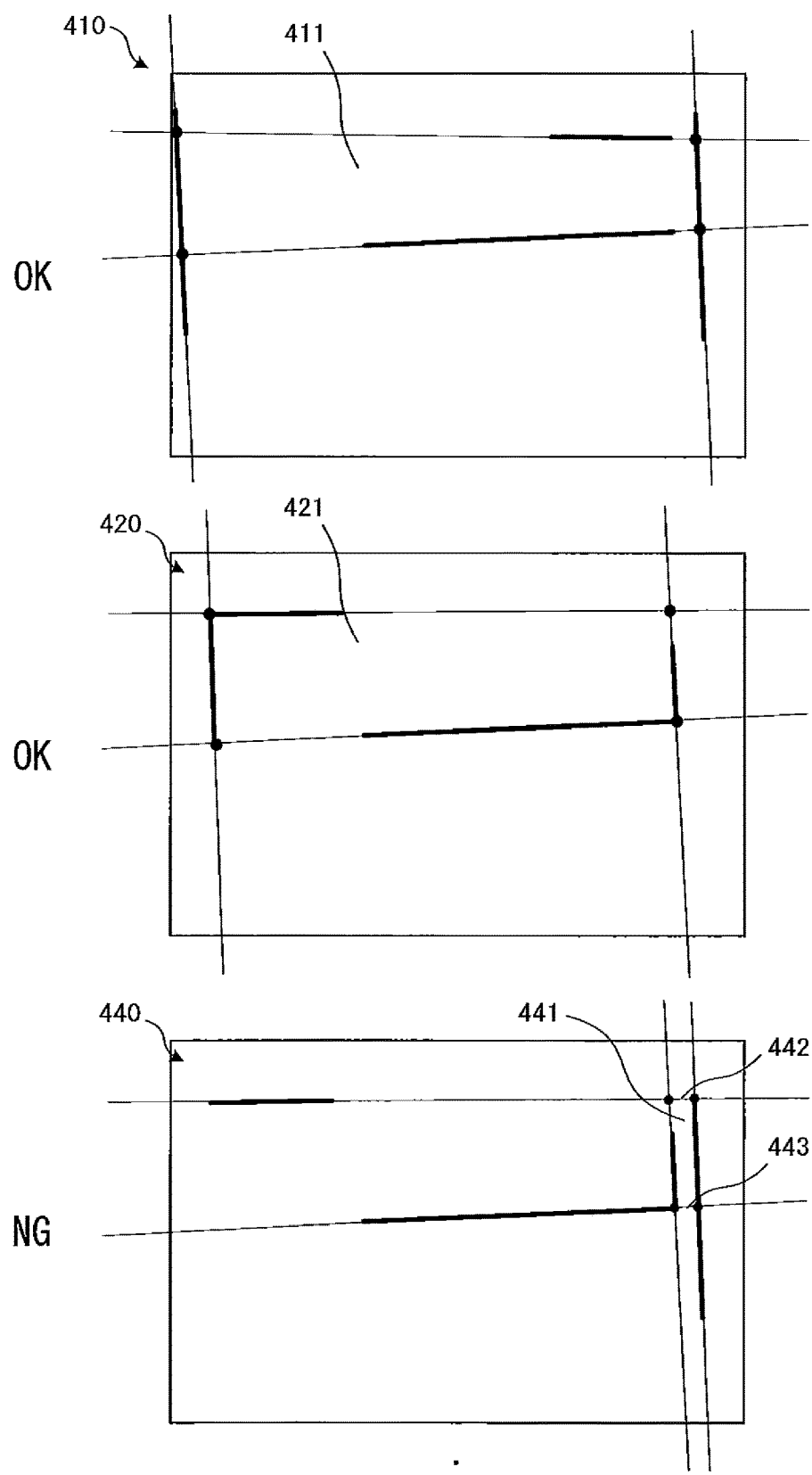
FIG. 10 is a view illustrating an example of determination of sides of the supposed polygons.

Also, for example, the predetermined condition may be that at least a part of each side included in a supposed polygon overlaps with at least a part of any line segment among line segments used to form the supposed polygon. A side that does not overlap with any line segments has the probability that it does not exists in an appearance of the predetermined object. By using this condition, it is possible to exclude a supposed polygon including a non-existent side. FIG. 10 is a view illustrating an example of determination of sides of a supposed polygon. As illustrated in FIG. 10, each side of each of the supposed polygons 411 and 421 overlaps with any of line segments used to form the supposed polygon. The supposed polygon 441 is formed by use of the combination of line segments 440. In the supposed polygon 441, sides 942 and 943 do not overlap with any of line segments in the combination 440.

Thus, the supposed polygon 441 is excluded from candidates for the corresponding polygon.

The polygon forming unit 114 may use both of the above-described two conditions, or may use only one of the conditions.

The corresponding polygon identifying unit 115 identifies, from supposed polygons formed by the polygon forming unit 114, a corresponding polygon that corresponds to a reference polygon based on a degree of similarity between a ratio among lengths of sides of the supposed polygon, and a ratio among lengths of sides of the reference polygon acquired by the reference ratio acquiring unit 111. Among the formed supposed polygons, a supposed polygon resembling the reference polygon has the probability that it has the same ratio among lengths of sides or a relatively high degree of similarity in a ratio among lengths of sides with respect to the reference polygon. The corresponding polygon identifying unit 115 calculates a length of each side based on coordinates of each vertex of the supposed polygon, and calculates a ratio among the lengths of sides of the supposed polygon. FIG. 11 is a view illustrating an example in specification of a ratio among lengths of sides of the supposed polygon. For example, for each of the supposed polygons 411, 421, and the like, a ratio among a length of a long side L1, a length of a short side L2, a length of a long side L3, and a length of a short side L4 are calculated. The corresponding polygon identifying unit 115 compares L1:L2:L3:L4 with RL1:RL2:RL3:RL4 for each supposed polygon.

The corresponding polygon identifying unit 115 may calculate a value such as a score indicating a degree of similarity between a ratio among the lengths of sides of the supposed polygon and a ratio among the lengths of sides of the reference polygon. For example, the corresponding polygon identifying unit 115 may regard the ratio among lengths of sides as vectors and calculate cosine similarity or the like as a score. By using this score, the corresponding polygon identifying unit 115 may identify, as the corresponding polygon, a supposed polygon having the highest degree of similarity among the supposed polygons. That is, the corresponding polygon has the same or a similar ratio among lengths of sides to that of the reference polygon. The corresponding polygon identifying unit 115 may not identify the corresponding polygon in a case where a degree of similarity is lower than a predetermined value with respect to a supposed polygon that has the highest degree of similarity. As described above, the corresponding polygon identifying unit 115 may identify the corresponding polygon from among supposed polygons whose components satisfy the predetermined condition.

The corresponding polygon identifying unit 115 may give a weight to the score indicating the degree of similarity and may identify the corresponding polygon based on the weighted score. A ratio among lengths of sides of a polygon in a photograph vary depending on a photographing angle to the predetermined object, or the like. Thus, there is a case where a ratio among lengths of sides of a supposed polygon which does not originally correspond to the reference polygon such as a polygon that does not exist in the appearance of the predetermined object is similar to the ratio among lengths of sides of the reference polygon. In such a situation, weighting is performed to improve accuracy of detecting the corresponding polygon.

For example, the corresponding polygon identifying unit 115 may give a weight to the score indicating the degree of similarity based on a degree of overlap between the formed supposed polygon and a polygon including all line segments used to form the supposed polygon. The polygon including all line segments used to form the supposed polygon is referred to as an all-line-segment-including polygon. For example, the all-line-segment-including polygon is a polygon in which each entire line segment used to form the supposed polygon is a part or whole of any side of the all-line-segment-including polygon or the line segment is located in the all-line-segment-including polygon. In addition to this, each vertex of the all-line-segment-including polygon is the same as any of end points of line segments used to form the supposed polygon or any vertex of the supposed polygon, for example. As the degree of overlap between the supposed polygon and the all-line-segment-including polygon becomes higher, the probability that the supposed polygon exists in the appearance of the predetermined object becomes higher.

A weight used for weighting according to the degree of overlap between polygons is called region overlap weight (ROW). For example, the corresponding polygon identifying unit 115 may calculate, as the ROW, a ratio between an area of a region in which the supposed polygon and the all-line-segment-including polygon overlap with each other, and an area of a region surrounded by sides of at least one of the supposed polygon and the all-line-segment-including polygon. That is, a ratio between a common part of the supposed polygon and the all-line-segment-including polygon and the logical sum of the supposed polygon and the all-line-segment-including polygon are calculated. The corresponding polygon identifying unit 115 may give the weight to the score in such a manner that the degree of similarity becomes higher as the degree of overlap between the supposed polygon and the all-line-segment-including polygon becomes higher.

FIG. 12 is a view illustrating an example of the degree of overlap between the supposed polygon and the all-line-segment-including polygon. As illustrated in FIG. 12, an all-line-segment-including polygon 412 is formed for the combination of line segments 410. An area of a region in which the supposed polygon 411 and the all-line-segment-including polygon 412 overlap with each other is around a half of an area of a region surrounded by sides of at least one of the supposed polygon 411 and the all-line-segment-including polygon 412. On the other hand, an all-line-segment-including polygon 422 formed for the combination of line segments 420 is substantially the same as the supposed polygon 421.

Also, for example, the corresponding polygon identifying unit 115 may give the weight to the score indicating the degree of similarity based on a degree of overlap between sides of the formed supposed polygon and line segments used to form the supposed polygon. As the degree of overlap between the sides and the line segments becomes higher, the probability that the sides included in the formed supposed polygon exists in the appearance of the predetermined object becomes higher.

The weight used for weighting according to the degree of overlap between sides and line segments is called line overlap weight (LOW). For example, the corresponding polygon identifying unit 115 calculates, as an overlap length, a length of at least one line that overlaps with any line segment among all sides included in the supposed polygon. Also, the corresponding polygon identifying unit 115 may calculate the sum of lengths of all sides included in the supposed polygon and a length of at least one line that does not overlap with any of the sides included in the supposed polygon among all line segments used to form the supposed polygon. The corresponding polygon identifying unit 115 may calculate, as the LOW, a ratio between the overlap length and the total length. That is, the ratio between a common part of the sides and the line segments and the logical sum of the sides and the line segments are calculated. The corresponding polygon identifying unit 115 may give the weight to the score in such a manner that the degree of similarity becomes higher as the degree of overlap between the sides and the line segments becomes higher.

FIG. 13 and FIG. 14 are views illustrating examples of the degree of overlap between the sides and the line segments. As illustrated in FIG. 13, for the combination of line segments 410, a common part 511 of the sides of the supposed polygon 411 and the line segments included in the combination 410 is identified. Also, the logical sum 512 of the sides of the supposed polygon 411 and the line segments included in the combination 410 is identified. As illustrated in FIG. 14, for the combination of line segments 420, a common part 521 of the sides of the supposed polygon 421 and the line segments included in the combination 420 is identified. Also, the logical sum 522 of the side of the supposed polygon 421 and the line segment included in the combination 420 is identified. As illustrated in FIG. 13 and FIG. 14, a degree of overlap between sids of the supposed polygon 411 and the line segments included in the combination 410 is lower than a degree of overlap between sides of the supposed polygon 421 and the line segments included in the combination 420.

The corresponding polygon identifying unit 115 may use both the ROW and the LOW for weighting, or may use either one for weighting. In the examples illustrated in FIG. 12 to FIG. 14, there is a high probability that the supposed polygon 421 is identified as the corresponding polygon in the supposed polygons 411 and 421.

The image processing unit 116 executes predetermined processing on an image in a region which is surrounded by sides of the corresponding polygon identified by the corresponding polygon identifying unit 115, in the photographic image acquired by the photographic image acquiring unit 112.

For example, the image processing unit 116 may transform the image in the region surrounded by the sides of the corresponding polygon in such a manner that a shape of the image is similar to the reference polygon. A shape of the image in the region surrounded by the sides of the corresponding polygon in the photographic image is the corresponding polygon. As described above, the corresponding polygon is not always similar to the reference image depending on the photographing angle or the like to the predetermined object. By this transform, the shape of the region surrounded by the sides of the corresponding polygon can be returned to the original shape. Also, an appearance of information in the region surrounded by the sides of the corresponding polygon in the photographic image becomes its original appearance. The image processing unit 116 performs affine transformation of the image in the region surrounded by the sides of the corresponding polygon, for example, based on the ratio among lengths of sides of the corresponding polygon, the ratio among lengths of sides of the reference polygon, angles formed between the sides, and the like. The image processing unit 116 may rotate the image in the region surrounded by the sides of the corresponding polygon. For example, an angle formed between a horizontal line and a predetermined side of the reference polygon is previously acquired as a reference angle. The image processing unit 116 transforms the image in such a manner that an angle formed between a side corresponding to the predetermined side of the reference polygon among sides included in the corresponding polygon and the horizontal line becomes the same as the reference angle.

The image processing unit 116 may recognize a predetermined kind of information from the image in the region surrounded by the sides of the corresponding polygon. Examples of the predetermined kind of information include characters, a symbol, a mark, a pattern, a picture, and the like. For example, pattern recognition such as character recognition or image recognition may be used as information recognition. The image processing unit 116 may perform the above-described transform on the image in the region surrounded by the sides of the corresponding polygon and may recognize the information from the transformed image. Thus, recognition accuracy of the information can be improved.

The image processing unit 116 performs output of at least one of the transformed image and the recognized information. For example, the image processing unit 116 may transmit the image or the information to another computer through a network, may cause the display unit 17 to display the image or the information, or may store the image or the information into the storage unit 14.

Figure 15:
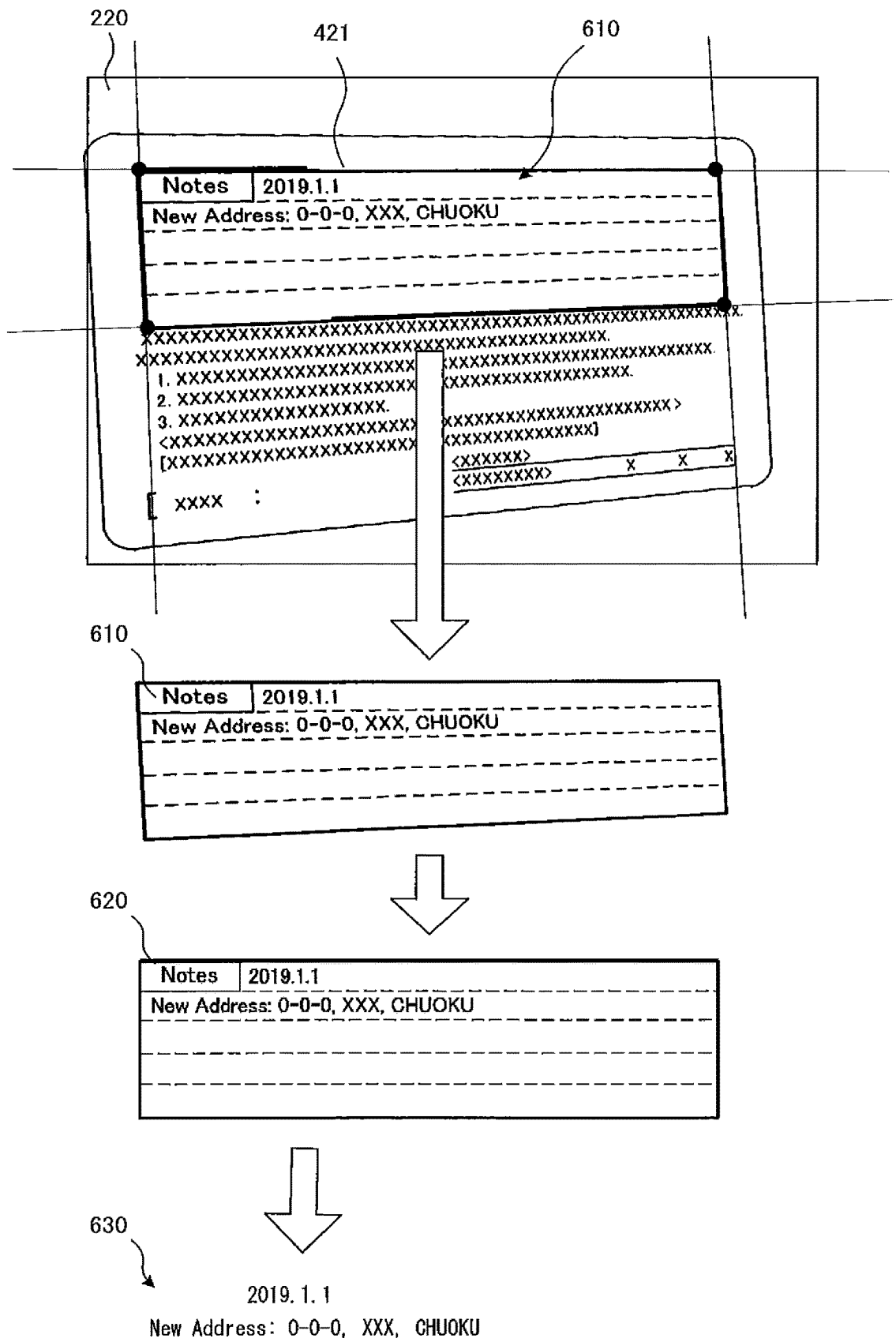
FIG. 15 is a view illustrating an example of processing of an image in a region surrounded by sides of a corresponding polygon.

FIG. 15 is a view illustrating a processing example of the image in the region surrounded by the sides of the corresponding polygon. As illustrated in FIG. 15, the polygon 421 is identified as a shape of an outer frame of the region 210 in the photographic image 220. Affine transformation of an image 610 in the region 210 into an image 620 is performed. A shape of the image 620 is similar to the reference polygon. Also, an angle of the image 620 is also adjusted. A character string 630 is recognized from this image 620. Note that the processing on the image in the region surrounded by the sides of the corresponding polygon may be performed by a device other than the polygon detection device 1, for example. In this case, the image processing unit 116 is not necessary.

[3. Operation of Polygon Detection Device]

Figure 16:
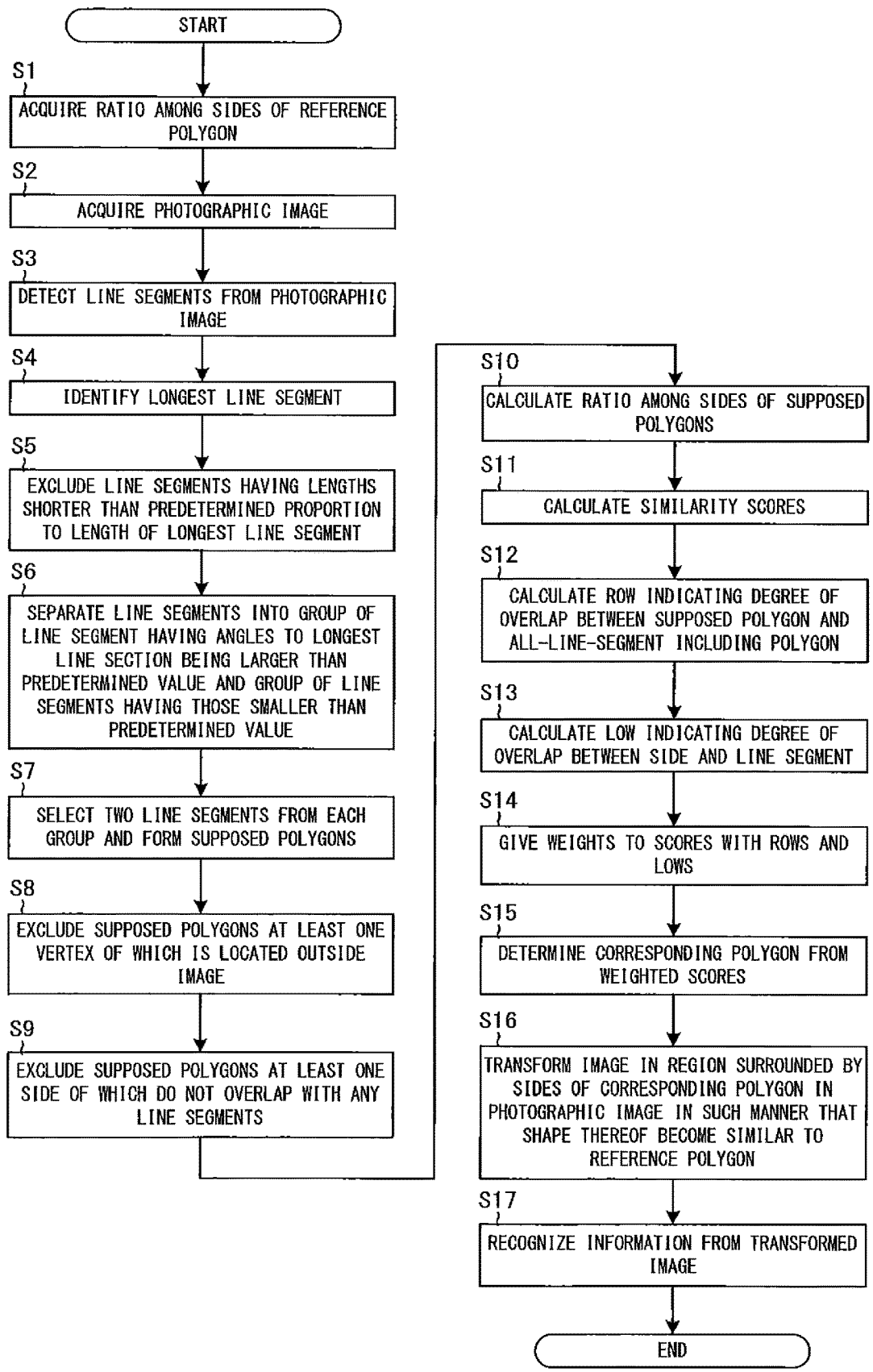
FIG. 16 is a flowchart illustrating an example of polygon detection processing by the system controller 11 of the polygon detection device 1.

Next, an operation of the polygon detection device 1 will be described with reference to FIG. 16. FIG. 16 is a flowchart illustrating an example of polygon detection processing by the system controller 11 of the polygon detection device 1. The system controller 11 executes the polygon detection processing according to program codes included in the polygon detection program.

As illustrated in FIG. 16, the reference ratio acquiring unit 111 acquires a ratio among lengths of sides of a reference polygon (step S1). Next, the photographic image acquiring unit 112 acquires a photographic image for detection of a corresponding polygon, and loads it into the RAM 11c (step S2).

Next, the line segment detection unit 113 detects line segments from the photographic image loaded into the RAM 1lc (step S3). The line segment detection unit 113 identifies the longest line segment among the detected line segments (step S4). The line segment detection unit 113 excludes, from line segments used to form supposed polygons, line segments having lengths shorter than the predetermined proportion to a length of the longest line segment among the detected line segments (step S5). The line segment detection unit 113 separates line segments having lengths equal to or longer than the predetermined proportion to the length of the longest line segment into a group of line segments that form angles to the longest line segment are larger than the predetermined value and a group of line segments that forms angles are equal to or smaller than the predetermined value (step S6).

Next, the polygon forming unit 114 selects two line segments from each group, and forms a supposed polygon by using the four line segments (step S7). The polygon forming unit 114 forms a predetermined number of supposed polygons, for example. Next, the polygon forming unit 114 excludes, from candidates for the corresponding polygon, supposed polygons at least one vertex of which is located outside the photographic image among the formed supposed polygons (step S8). Also, the polygon forming unit 114 excludes, from the candidates for the corresponding polygon, supposed polygons in which at least one side does not overlap with any of line segments used to form the supposed polygon among the formed supposed polygons (step S9).

Next, the corresponding polygon identifying unit 115 calculates a ratio among lengths of sides of each supposed polygon identified as the candidates for the corresponding polygon (step S10). The corresponding polygon identifying unit 115 calculates, for each supposed polygon, a score indicating a degree of similarity in the ratio among the lengths of sides to the reference polygon (step S11). Next, the corresponding polygon identifying unit 115 forms an all-line-segment-including polygon for each supposed polygon, and calculates ROW indicating a degree of overlap between the supposed polygon and the all-line-segment-including polygon (step S12). Also, for each supposed polygon, the corresponding polygon identifying unit 115 calculates LOW indicating a degree of overlap between sides of the supposed polygon and line segments used to form the supposed polygon (step S13). The corresponding polygon identifying unit 115 gives a weight to a score of each supposed polygon by using the ROW and the LOW (step S14). The corresponding polygon identifying unit 115 identifies, as the corresponding polygon, a supposed polygon having the highest degree of similarity indicated by the weighted score among the supposed polygons (step S15).

Next, with respect to the acquired photographic image, the image processing unit 116 transforms an image in a region surrounded by sides of the corresponding polygon in such a manner that a shape of the image becomes similar to the reference polygon, and performs rotational transformation of the image (Step S16). The image processing unit 116 recognizes information from the transformed image and outputs the recognized information (step S17). When this process is finished, the system controller 11 ends the polygon detection processing.

As described above, according to the present embodiment, the system controller 11 acquires a ratio among lengths of sides of a reference polygon included in an appearance of a predetermined object. Also, the system controller 11 acquires a photographic image of the predetermined object. Also, the system controller 11 detects line segments from the acquired photographic image. Also, the system controller 11 forms at least one supposed polygon based on the detected line segments. Also, the system controller 11 identifies a polygon corresponding to the reference polygon from the supposed polygon based on a degree of similarity between a ratio among lengths of sides of the supposed polygon and a ratio among lengths of sides of the reference polygon. Thus, a polygon resembling the reference polygon can be accurately detected from the image.

The system controller 11 may identify the line segments used to form the supposed polygon from a relatively long line segments among detected line segments. In this case, in a case where a region to be identified is equal to or larger than a certain degree in the photographic image, it is possible to form the supposed polygon by using line segments that have a high probability that they are included in the supposed polygon corresponding to the reference polygon.

The system controller 11 may separate at least some line segments among the detected line segments into a plurality of groups determined based on a relationship among sides included in the reference polygon. Also, the system controller 11 may identify a line segment used to form the supposed polygon from each of the plurality of groups. In this case, the supposed polygon can be formed by use of line segments corresponding to sides included in the reference polygon. Also, since the number of combinations of line segments used to form the supposed polygons can be reduced, a speed of detecting the corresponding polygon can be improved.

The system controller 11 may separate the at least some line segments among the detected line segments into the plurality of groups based on angles of the line segments. In this case, the plurality of groups can be determined based on the angles among the sides included in the reference polygon. Thus, it is possible to form the supposed polygon by using line segments corresponding to sides included in the reference polygon.

The reference polygon and the formed supposed polygon may be quadrangles. Also, the system controller 11 may separate the at least some line segments into a group of line segments with angles to a predetermined line segment being larger than a predetermined value and a group of line segments with angles to the predetermined line segment being equal to or smaller than the predetermined value . In this case, an appropriate quadrangle can be formed.

The system controller 11 may identify the corresponding polygon from the supposed polygons whose components satisfy a predetermined condition among the formed supposed polygons. Here, the predetermined condition may be that all vertices of the supposed polygon are located in the photographic image. In this case, in a case where the predetermined object is photographed in such a manner that a whole region surrounded by sides of the reference polygon in the predetermined object is included in a photographing range, accuracy of detecting a polygon corresponding to the reference polygon can be improved.

The predetermined condition may be that at least a part of each side included in the supposed polygon overlaps with at least a part of any line segment among line segments used to form the supposed polygon. In this case, a supposed polygon having a high probability that it corresponds to a polygon existing in the appearance of the predetermined object can be identified as the polygon corresponding to the reference polygon.

The system controller 11 may give a weight to a value indicating a degree of similarity between a ratio among lengths of sides of the reference polygon and a ratio among lengths of sides of the formed supposed polygon, and identify the corresponding polygon based on the weighted value. In this case, by weighting on a degree of similarity in the ratio among the lengths of sides, even when a ratio among the lengths of sides of a polygon corresponding to the reference polygon vary according to a photographing angle to the predetermined object, accuracy of detecting the polygon corresponding to the reference polygon can be improved.

Here, the system controller 11 may form a supposed polygon having, as vertices, points where straight lines including line segments used to form the supposed polygon intersect with each other. Also, the system controller 11 may give the weight to the value based on a degree of overlap between the formed supposed polygon and a polygon including all line segments used to form the supposed polygon. In this case, it is possible to increase the weight of the supposed polygon having a high probability that it exists.

The system controller 11 may give the weight to the value based on a degree of overlap between sides of the formed supposed polygon and line segments used to form the supposed polygon. In this case, it is possible to increase the weight of a supposed polygon including sides having a high probability that they exist.

The system controller 11 may execute predetermined processing on an image in a region surrounded by sides of the identified corresponding polygon in the photographic image. In this case, it is possible to perform processing on the image in the region to be identified in the predetermined object.

Here, the system controller 11 may transform the image in the region surrounded by the sides of the identified corresponding polygon in such a manner that a shape of the region becomes similar to the reference polygon. In this case, a shape of the image in the region to be identified in the predetermined object can be returned to an original shape of the region.

The system controller 11 may recognize a predetermined kind of information from the image in the region surrounded by the sides of the identified corresponding polygon. In this case, information in the region to be identified in the predetermined object can be recognized from the photographic image. Here, the predetermined kind of information may be a character.

EXAMPLES

Next, an example of the above-described embodiment will be described with reference to FIG. 17. In the present example, the polygon detection device 1 is used as a server device to perform identity verification of a user.

Figure 17:
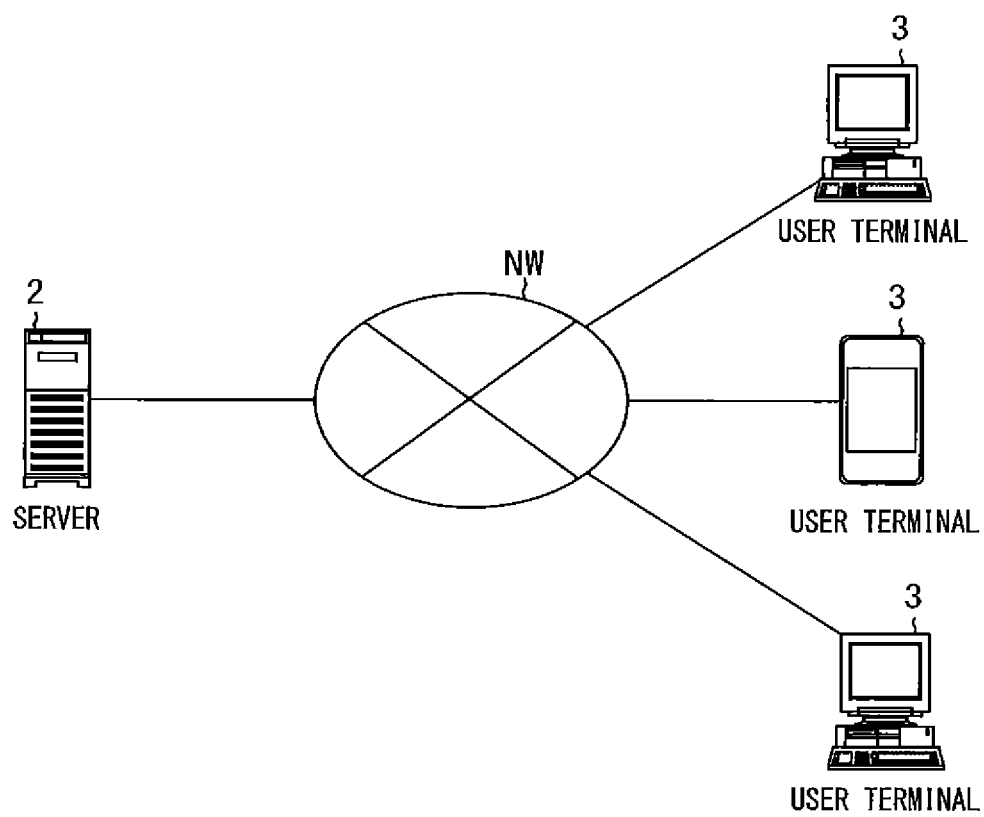
FIG. 17 is a view illustrating an example of a schematic configuration of a system S according to one example.

FIG. 17 is a view illustrating an example of a schematic configuration of a system S according to the present example. As illustrated in FIG. 17, the system S includes a server 2 and a plurality of user terminals 3. The server 2 and each user terminal 3 can transmit and receive data to each other through a network NW by using TCP/IP or the like as a communication protocol, for example. Note that the network NW is the Internet, for example.

The user terminal 3 is a terminal device used by a user who intends to sign up for a predetermined service, for example. For example, the user terminal 3 includes a digital camera or is connected to the digital camera. Examples of the user terminal 3 include a personal computer, a mobile information terminal such as a smartphone, or a tablet computer, a mobile phone and a personal digital assistant (PDA), and the like. The user inputs personal information such as a name, a date of birth, and an address into the user terminal 3 for sign up. The user terminal 3 transmits the input information to the server 2. Also, the user photographs an identification card and transmits a first photographic image from the user terminal 3 to the server 2. The user performs photographing in such a manner that all pieces of personal information are clearly captured. Thus, it is probable that the photographic image includes a whole of each region of the personal information, and each region occupies a certain size or more in the photographic image. The identification card is, for example, a driver's license, a passport, or the like. Moreover, the user photographs a face of the user himself/herself and transmits a second photographic image from the user terminal 3 to the server 2.

The server 2 has a configuration the same as the configuration of the polygon detection device 1. For each of one or more regions where personal information is printed or described in each of various identification cards, the storage unit 14 of the server 2 stores information indicating a ratio among lengths of sides of a reference polygon as a shape of the region. Also, the storage unit 14 stores information indicating coordinates of each line included in the region so that information of a character string can be easily recognized from each region. Furthermore, the storage unit 14 stores, for each of various identification cards, information indicating a ratio among lengths of sides of a reference polygon as a shape of a region of a face photograph.

The server 2 detects a polygon corresponding to the reference polygon from the first photographic image received from the user terminal 3. The server 2 transforms an image in a region surrounded by sides of the detected corresponding polygon in the first photographic image in such a manner that a shape of the image becomes similar to the reference polygon. In addition, the server 2 rotates the image in the region in such a manner that an angle of a predetermined side of a reference image and an angle of a side of the corresponding polygon that corresponds to the predetermined side becomes the same. The server 2 recognizes personal information such as a name, a date of birth, and an address from the image transformed for the region where the personal information is described. The server 2 determines whether the recognized personal information is the same as personal information input by the user. Also, the server 2 extracts feature vectors of a face of a person on the identification card from an image transformed with for a region of the face photograph. The server 2 also extracts feature vectors of a face from the second photographic image. The server 2 compares the face feature vectors and determines whether the person on the identification card is the same as a person on the second photographic image.

REFERENCE SIGNS LIST

1 polygon detection device
11 system controller
12 system bus
13 input/output interface
14 storage unit
15 communication unit
16 input unit
17 display unit
111 reference ratio acquiring unit
112 photographic image acquiring unit
113 line segment detection unit
114 polygon forming unit
115 corresponding polygon identifying unit
116 image processing unit
2 server
3 user terminal

The invention claimed is:

1. A polygon detection device comprising:
   at least one memory configured to store computer program code; and
   at least one processor configured to access the computer program code and operate as instructed by the computer program code, the computer program code including:
      ratio acquiring code configured to cause at least one of the at least one processor to acquire a ratio among lengths of sides of a reference polygon included in an appearance of a predetermined object;
      image acquiring code configured to cause at least one of the at least one processor to acquire a photographic image of the predetermined object;
      detection code configured to cause at least one of the at least one processor to detect line segments from the acquired photographic image;
      forming code configured to cause at least one of the at least one processor to form at least one candidate polygon based on the detected line segments; and identifying code configured to cause at least one of the at least one processor to identify, from the at least one formed candidate polygon, a polygon corresponding to the reference polygon based on a score value, the score value being obtained by using a degree of similarity between a ratio among lengths of sides of each of the at least one formed candidate polygon and the acquired ratio among the lengths of the sides of the reference polygon, wherein the detection code is configured to cause at least one of the at least one processor to separate at least some line segments into a first group and a second group, an angle between each line segment in the first group and a predetermined line segment among the at least some line segments being larger than a predetermined value, an angle between each line segment in the second group and the predetermined line segment being equal to or smaller than the predetermined value, wherein the forming code is configured to cause at least one of the at least one processor to select a first preset number of line segments from line segments included in the first group, select a second preset number of line segments from line segments included in the second group, and form the at least one candidate polygon based on the selected first preset number of line segments and the selected second preset number of line segments, wherein the identifying code is configured to cause at least one of the at least one processor to:

obtain a degree of overlap between each of the at least one formed candidate polygon and a polygon including all line segments used to form each of the at least one formed candidate polygon;

give a weight to the score value, for each of the at least one formed candidate polygon, to obtain a weighted score, wherein the weight increases as the degree of overlap becomes higher; and identify the polygon corresponding to the reference polygon based on at least one weighted score.

2. The polygon detection device according to claim 1, wherein the forming code is configured to cause at least one of the at least one processor to identify line segments used to form the at least one candidate polygon from line segments having lengths longer than a predetermined portion to a length of a longest line segment among the detected line segments.

3. The polygon detection device according to claim 1, wherein the detection code is configured to cause at least one of the at least one processor to separate at least some line segments among the detected line segments into a plurality of groups defined based on a relationship among the sides of the reference polygon, and the forming code is configured to cause at least one of the at least one processor to identify at least one line segment used to form each of the at least one candidate polygon from each of the plurality of groups.

4. The polygon detection device according claim 1, wherein the detection code is configured to cause at least one of the at least one processor to separate at least some line segments among the detected line segments into a plurality of groups based on angles of the at least some line segments, and the forming code is configured to cause at least one of the at least one processor to identify at least one line segment used to form each of the at least one candidate polygon from each of the plurality of groups.

5. The polygon detection device according to claim 4, wherein the reference polygon and the at least one formed candidate polygon are quadrangles.

6. The polygon detection device according to claim 1, wherein the identifying code is configured to cause at least one of the at least one processor to identify the polygon corresponding to the reference polygon from at least one satisfying polygon, among the at least one formed candidate polygon, whose components satisfy a predetermined condition.

7. The polygon detection device according to claim 6, wherein all vertices of the at least one satisfying polygon are located in the photographic image.

8. The polygon detection device according to claim 6, wherein at least a part of each side included in the at least one satisfying polygon overlaps with at least a part of any line segment among line segments used to form the at least one satisfying polygon.

9. The polygon detection device according to claim 1, wherein the forming code is configured to cause at least one of the at least one processor to form, as each of the at least one candidate polygon, a polygon having vertices that each are a point at which two straight lines each including any of line segments used to form a polygon intersect with each other.

10. The polygon detection device according to claim 1, wherein the forming code is configured to cause at least one of the at least one processor to form, as each of the at least one candidate polygon, a polygon having vertices that each are a point at which two straight lines each including any of line segments used to form a polygon intersect with each other, and the identifying code is configured to cause at least one of the at least one processor to give the weight to the score value based on a degree of overlap between sides of the formed polygon and the line segments used to form the polygon.

11. A polygon detection method performed by a computer, the method comprising:

acquiring a ratio among lengths of sides of a reference polygon included in an appearance of a predetermined object;

acquiring a photographic image of the predetermined object;

detecting line segments from the acquired photographic image;

forming at least one candidate polygon based on the detected line segments; and identifying, from the at least one formed candidate polygon, a polygon corresponding to the reference polygon based on a score value, the score value being obtained by using a degree of similarity between a ratio among lengths of sides each of the at least one formed candidate polygon and the acquired ratio among the lengths of the sides of the reference polygon, wherein the method further comprises:

separating at least some line segments into a first group and a second group, an angle between each line segment in the first group and a predetermined line segment among the at least some line segments being larger than a predetermined value, an angle between each line segment in the second group and the predetermined line segment being equal to or smaller than the predetermined value;

selecting a first preset number of line segments from line segments included in the first group and selecting a second preset number of line segments from line segments included in the second group;

forming the at least one candidate polygon based on the selected first preset number of line segments and the selected second preset number of line segments;

obtaining a degree of overlap between each of the at least one formed candidate polygon and a polygon including all line segments used to form each of the at least one formed candidate polygon;

giving a weight to the score value, for each of the at least one formed candidate polygon, to obtain a weighted score, wherein the weight increases as the degree of overlap becomes higher; and identifying the polygon corresponding to the reference polygon based on at least one weighted score.

12. The polygon detection method according to claim 11, wherein the photographic image is loaded into a memory, and the line segments are detected from the photographic image loaded into the memory.

13. A non-transitory computer readable medium storing thereon a polygon detection program configured to cause a computer to:

acquire a ratio among lengths of sides of a reference polygon included in an appearance of a predetermined object;

acquire a photographic image of the predetermined object;

detect line segments from the acquired photographic image;

form at least one candidate polygon based on the detected line segments; and identify, from the at least one formed candidate polygon, a polygon corresponding to the reference polygon based on a score value, the score value being obtained by using a degree of similarity between a ratio among lengths of sides of each of the at least one formed candidate polygon and the acquired ratio among the lengths of the sides of the reference polygon, wherein the polygon detection program further causes the computer to:

separate at least some line segments into a first group and a second group, an angle between each line segment in the first group and a predetermined line segment among the at least some line segments being larger than a predetermined value, an angle between each line segment in the second group and the predetermined line segment being equal to or smaller than the predetermined value;

select a first preset number of line segments from line segments included in the first group and select a second preset number of line segments from line segments included in the second group;

form the at least one candidate polygon based on the selected first preset number of line segments and the selected second preset number of line segments;

obtain a degree of overlap between each of the at least one formed candidate polygon and a polygon including all line segments used to form each of the at least one formed candidate polygon;

give a weight to the score value, for each of the at least one formed candidate polygon, to obtain a weighted score, wherein the weight increases as the degree of overlap becomes higher; and identify the polygon corresponding to the reference polygon based on at least one weighted score.

14. The polygon detection device according to claim 1, wherein the computer program code further comprises transforming code configured to cause at least one of the at least one processor to:

obtain, as a reference angle, an angle between a horizontal line and a predetermined side of the reference polygon; and transform an image of the identified polygon in a manner such that an angle formed between a side corresponding to the predetermined side of the reference polygon among sides included in the identified polygon and the horizontal line is the same angle as the reference angle.

15. The polygon detection device according to claim 14, wherein the transforming code is configured to cause at least one of the at least one processor to transform the image in a region surrounded by the sides of the identified polygon in such a manner that a shape of the region becomes similar to the reference polygon.

16. The polygon detection device according to claim 14, wherein the computer program code is configured to cause at least one of the at least one processor to recognize a predetermined kind of information from the transformed image in a region surrounded by the sides of the identified polygon.

17. The polygon detection device according to claim 16, wherein the predetermined kind of information is at least one character.

18. The polygon detection device according to claim 15, wherein the computer program code is configured to cause at least one of the at least one processor to recognize a predetermined kind of information from the transformed image.

19. The polygon detection device according to claim 14, wherein the transforming code is further configured to cause at least one of the at least one processor to perform an affine transformation of the image in a region surrounded by the sides of the identified polygon.

* * * * *